(12) United States Patent
Takeda et al.

(10) Patent No.: US 11,277,219 B2
(45) Date of Patent: Mar. 15, 2022

(54) USER TERMINAL AND RADIO COMMUNICATION METHOD

(71) Applicant: NTT DOCOMO, INC., Tokyo (JP)

(72) Inventors: Kazuaki Takeda, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/317,096

(22) PCT Filed: Jul. 12, 2017

(86) PCT No.: PCT/JP2017/025445
§ 371 (c)(1),
(2) Date: Jan. 11, 2019

(87) PCT Pub. No.: WO2018/012550
PCT Pub. Date: Jan. 18, 2018

(65) Prior Publication Data
US 2019/0229840 A1    Jul. 25, 2019

(30) Foreign Application Priority Data
Jul. 15, 2016 (JP) .............................. JP2016-140778

(51) Int. Cl.
*H04W 72/04* (2009.01)
*H04L 1/00* (2006.01)
(Continued)

(52) U.S. Cl.
CPC .......... *H04L 1/0013* (2013.01); *H04L 5/0007* (2013.01); *H04W 28/06* (2013.01);
(Continued)

(58) Field of Classification Search
CPC .... H04L 1/0013; H04L 5/0007; H04W 28/06; H04W 72/04; H04W 72/1273; H04W 72/14
See application file for complete search history.

(56) References Cited

U.S. PATENT DOCUMENTS 10,536,946 B2 * 1/2020 Zhu ...................... H04W 40/20
2013/0322350 A1 * 12/2013 Gaur ..................... H04L 1/0013
370/329
(Continued)

OTHER PUBLICATIONS

International Search Report issued in PCT/JP2017/025445 dated Sep. 19, 2017 (2 pages).
(Continued)

*Primary Examiner* — Phuc H Tran
(74) *Attorney, Agent, or Firm* — Osha Bergman Watanabe & Burton LLP

(57) ABSTRACT

To improve spectral usage efficiency in the case where an interrupt by a second signal occurs in a part of frequency resources allocated to a first signal, in one aspect of the present invention, in the case where frequency resources for the first signal are allocated using a second allocation unit comprised by including a plurality of first allocation units that are minimum allocation units, and in the case where the second signal is allocated to a part of the frequency resources, in a subcarrier at least a part of which overlaps with the second signal, or in the first allocation unit at least a part of which overlaps with the second signal, the first signal is subjected to rate-matching and/or puncturing.

4 Claims, 15 Drawing Sheets

(51) Int. Cl.
*H04W 28/06* (2009.01)
*H04L 5/00* (2006.01)
*H04W 72/12* (2009.01)
*H04W 72/14* (2009.01)

(52) U.S. Cl.
CPC ....... *H04W 72/04* (2013.01); *H04W 72/1273* (2013.01); *H04W 72/14* (2013.01)

(56) References Cited

U.S. PATENT DOCUMENTS

| | | | |
|---|---|---|---|
| 2014/0126490 A1* | 5/2014 | Chen | H04L 1/0067 370/329 |
| 2016/0227548 A1* | 8/2016 | Nimbalker | H04W 72/042 |
| 2017/0156140 A1* | 6/2017 | Islam | H04L 5/0044 |
| 2017/0332387 A1* | 11/2017 | Zhang | H04L 27/2602 |
| 2018/0007673 A1* | 1/2018 | Fwu | H04L 5/0037 |
| 2018/0048435 A1* | 2/2018 | Islam | H04W 72/005 |
| 2018/0199341 A1* | 7/2018 | Baldemair | H04L 5/0087 |
| 2018/0359745 A1* | 12/2018 | Yeo | H04L 5/0055 |
| 2020/0076667 A1* | 3/2020 | Kim | H04L 5/005 |

OTHER PUBLICATIONS

Written Opinion of the International Searching Authority issued in PCT/JP2017/025445 dated Sep. 19, 2017 (5 pages).
Huawei, HiSilicon; "Remaining details of SRS avoidance"; 3GPP TSG RAN WG1 Meeting #84bis, R1-162629; Busan, Korea; Apr. 11-15, 2016 (4 pages).
CATT; "Discussion on the simultaneous transmissions of normal TTI and sTTI"; 3GPP TSG RAN WG1 Meeting #85, R1-164235; Nanjing, China; May 23-27, 2016 (4 pages).
Samsung; "sPDCCH and sDCI design"; 3GPP TSG RAN WG1 Meeting #85, R1-164793; Nanjing, China; May 23-27, 2016 (7 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report issued in European Application No. 17827676.2, dated Feb. 11, 2020 (7 pages).
3GPP TSG RAN WG1 Meeting #82; R1-154274 "Beamformed CSI-RS related enhancements based on the identified approaches" LG Electronics; Beijing, China; Aug. 24-28, 2015 (7 pages).
3GPP TSG RAN WG1 NB-IoT Ad-Hoc Meeting; R1-160176 "Considerations on NB-PDSCH" Sony; Budapest, Hungary; Jan. 18-20, 2016 (8 pages).
Office Action issued in counterpart Japanese Application No. 2018-527641 dated Sep. 7, 2021 (8 pages).
Qualcomm Incorporated; "DL channel design for shortened TTI"; 3GPP TSG RAN WG1 #85, R1-164458; May 23-27, 2016; Nanjing, China (7 pages).
Huawei, HiSilicon; "PDSCH rate matching enhancement for aperiodic NZP and ZP CSI-RS"; 3GPP TSG RAN WG1 meeting #85, R1-164845; Nanjing, China, May 23-27, 2016 (4 pages).

* cited by examiner

| CC Bandwidth | RBG Size (P) |
|---|---|
| ≤10 | 1 |
| 11-26 | 2 |
| 27-63 | 3 |
| 64-110 | 4 |

FIG. 1

| Resource allocation granularity | Subcarrier spacing | | |
|---|---|---|---|
| | 15kHz | 60kHz | 240kHz |
| BW for 12 SCs (MHz) | 0.18 | 0.72 | 2.88 |
| BW for 48 SCs (MHz) | 0.72 | 2.88 | 11.52 |

FIG. 3

| CC Bandwidth | RBG Size (P) |
|---|---|
| ≦10 | 1 |
| 11-26 | 2 |
| 27-63 | 3 |
| 64-110 | 4 |
| 111≦ | 4 |

FIG. 4A

| CC Bandwidth | RBG Size (P) |
|---|---|
| ≦10 | 1 |
| 11-26 | 2 |
| 27-63 | 3 |
| 64-110 | 4 |
| 111≦ | 8 |

FIG. 4B

USER TERMINAL AND RADIO COMMUNICATION METHOD

TECHNICAL FIELD

The present invention relates to a user terminal and radio communication method in the next-generation mobile communication system.

BACKGROUND ART

In UMTS (Universal Mobile Telecommunications System) networks, for the purpose of higher data rates, low delay and the like, Long Term Evolution (LTE) has been specified (Non-patent Document 1). Further, for the purpose of wider bands and higher speed than LTE (also referred to as LTE Rel. 8 or 9), LTE-A (LTE-Advanced, also referred to as LTE Rel.10~13 and the like) has been specified, and successor systems (e.g., also referred to as FRA (Future Radio Access), 5G (5th generation mobile communication system), NR (New RAT: Radio Access Technology), LTE Rel.14~ and the like) to LTE have been studied.

In the existing LTE system (e.g., prior to Rel.13), as an allocation unit of frequency resources, it is possible to use a resource block group (RBG) comprised of one or more resource blocks (RB). Allocation of frequency resources in the RBG unit is also called resource allocation type 0 and the like. Herein, the RB is a minimum allocation unit of frequency resources, and includes 12 subcarriers with a subcarrier spacing of 15 kHz to be comprised thereof. Further, the RB is also called a physical resource block (PRB) and the like.

PRIOR ART DOCUMENT

Non-Patent Document

[Non-patent Document 1] 3GPP TS 36.300 V8.12.0 "Evolved Universal Terrestrial Radio Access (E-UTRA) and Evolved Universal Terrestrial Radio Access Network (E-UTRAN); Overall description; Stage 2; (Release 8)" April, 2010

DISCLOSURE OF INVENTION

Problems to be Solved by the Invention

In the existing LTE system, in the case of allocating another communication (e.g., NB-IoT: Narrow Band-Internet of Things) to a part of an RBG allocated to a DL shared channel (e.g., PDSCH: Physical Downlink Shared Channel) and/or UL shared channel (e.g., PUSCH: Physical Uplink Shared Channel) (hereinafter, referred to as PDSCH/PUSCH), in the entire RBG, PDSCH/PUSCH undergoes rate-matching and/or puncturing.

Therefore, in the existing LTE system, when an interrupt by another communication occurs in a part of the RBG allocated to PDSCH/PUSCH, RBs except a part of RBs inside the RBG are not in use, and there is the problem that spectral usage efficiency degrades.

In future radio communication systems where it is expected to allocate frequency resources with the same and/or different granularity as/from the existing LTE system, there is the risk that such a problem occurs also in the case of allocating a second signal (e.g., NR-IoT: New Radio access technology-Internet of Things) to a part of frequency resources allocated to a first signal (e.g., PDSCH/PUSCH).

The present invention was made in view of such a respect, and it is an object of the invention to provide a user terminal and radio communication method capable of improving spectral usage efficiency, in the case where an interrupt by a second signal (e.g., NB-IoT, NR-IoT and the like) occurs in a part of frequency resources allocated to a first signal (e.g., PDSCH/PUSCH).

Means for Solving the Problem

A user terminal according to one aspect of the present invention is characterized by being provided with a transmission/reception section that transmits and/or receives a first signal, and a control section that controls transmission and/or reception of the first signal, where in the case where frequency resources for the first signal are allocated using a second allocation unit comprised by including a plurality of first allocation units that are minimum allocation units, and in the case where a second signal is allocated to a part of the frequency resources, in a subcarrier at least a part of which overlaps with the second signal, or in the first allocation unit at least a part of which overlaps with the second signal, the first signal is subjected to rate-matching and/or puncturing.

Advantageous Effect of the Invention

According to the present invention, in the case where an interrupt by the second signal occurs in a part of frequency resources allocated to the first signal, it is possible to improve spectral usage efficiency.

BRIEF DESCRIPTION OF DRAWINGS

FIG. 1 is a diagram showing one example of RBG sizes in the existing LTE system;

FIG. 3 is a diagram showing one example of a relationship between a subcarrier spacing and a bandwidth of the predetermined number of RBs;

FIGS. 4A and 4B are diagrams showing one example of allocation granularity of frequency resources in the future radio communication system;

BEST MODE FOR CARRYING OUT THE INVENTION

In future radio communication systems (e.g., 5G, NR and the like) is studied multiple access based on OFDMA (Orthogonal Frequency-Division Multiple Access). Specifically, in the future radio communication system, it is expected to perform scheduling in a subband and/or wide band, and perform asynchronous retransmission control (HARQ: Hybrid Automatic Repeat reQuest).

Herein, the wide band is a frequency band comprised of a bandwidth (CC bandwidth) of each component carrier (CC) (also referred to as a cell, carrier and the like). The CC bandwidth includes the predetermined number of resource blocks (RBs) to be comprised thereof, and is also called a system bandwidth and the like. In the existing LTE system, the CC bandwidth is 20 MHz at the maximum, and in the future radio communication system, is expected to exceed 20 MHz (described later).

The subband is a frequency band comprised of the predetermined number of contiguous resource blocks (RBs) fewer than in the wideband. The number of RBs (subband size) constituting the subband may be determined based on the CC bandwidth. Further, whether or not to set the subband may be determined based on the CC bandwidth.

In scheduling of the subband and/or wideband, a user terminal transmits channel state information (CSI) as feedback in a subband and/or wide band unit, and a radio base station performs scheduling of PDSCH based on the CSI. Further, based on a UL reference signal (e.g., SRS: Sounding Reference Signal) from the user terminal, the radio base station performs scheduling of PUSCH.

Specifically, the radio base station is capable of allocating PDSCH/PUSCH to the predetermined number of RBs meeting the predetermined communication quality. For example, the predetermined number of PRBs may be localized RBs i.e. the predetermined number of contiguous RBs.

In such frequency selective scheduling, it is possible to use a resource block group (RBG) comprised of the predetermined number of contiguous RBs (also called resource allocation type 0 and the like). The number of RBs (RBG size) constituting the RBG may be determined corresponding to the CC bandwidth.

FIG. 1 is a diagram showing one example of RBG sizes in the existing LTE system. As shown in FIG. 1, in the case where the CC bandwidth (system bandwidth) is comprised of 10 or less RBs, the RBG is comprised of 1 RB. In the case where the CC bandwidth is comprised of 11 to 26 RBs, the RBG is comprised of 2 RBs. In the case where the CC bandwidth is comprised of 27 to 63 RBs, the RBG is comprised of 3 RBs. In the case where the CC bandwidth is comprised of 64 to 110 RBs, the RBG is comprised of 4 RBs.

Figure 2:
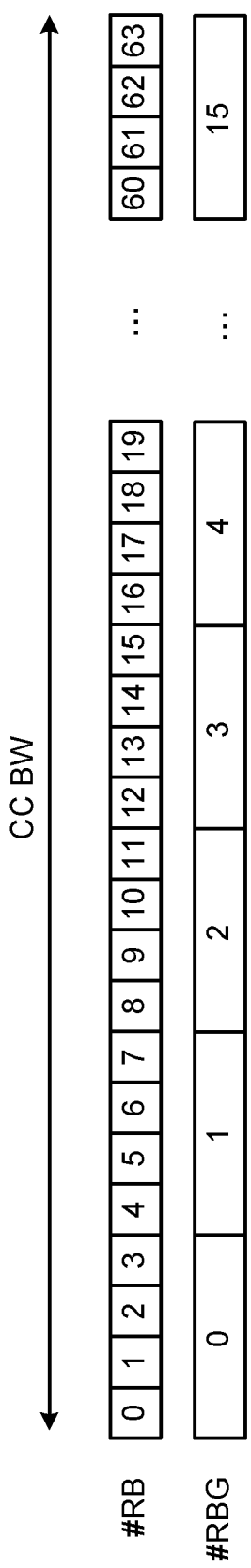
FIG. 2 is a diagram showing one example of resource allocation in an RBG unit.

FIG. 2 is a diagram showing one example of resource allocation in an RBG unit. For example, as shown in FIG. 2, in the case where the CC bandwidth is comprised of 64 RBs, the RBG is comprised of 4 RBs (see FIG. 1). In FIG. 2, allocation of frequency resources to the user terminal is performed using a bitmap (herein, bitmap of 16 bits) including bits that correspond to respective RBGs.

Thus, in the case of allocating frequency resources in an RBG unit, as compared with the case of allocating frequency resources in an RB unit (e.g., bitmap of 64 bits is required in FIG. 2), although flexibility of resource allocation is impaired, it is possible to suppress increase in the number of bits of downlink control information (DCI).

In addition, in the future radio communication system (e.g., 5G, NR and the like), it is expected to use a bandwidth (e.g., 200 MHz, bandwidth larger than 100 MHz and the like) larger than 20 MHz that is the maximum CC bandwidth in the existing LTE system as a CC bandwidth.

In the future radio communication system where it is expected to use a CC bandwidth wider than in the existing LTE system, what granularity is used to allocate frequency resources becomes a problem. For example, considered are a method (1) of maintaining allocation granularity in the existing LTE system, and another method (2) of modifying allocation granularity in the existing LTE system.

FIG. 3 is a diagram illustrating a relationship between a subcarrier spacing and a bandwidth of the predetermined number of RBs. In addition, in FIG. 3, the case where 1 RB is comprised of 12 subcarriers is assumed, but the number of subcarriers constituting 1 RB is not limited thereto. Further, in FIG. 3, as the subcarrier spacing, 15 kHz, 60 kHz and 240 kHz are shown, but the subcarrier spacing is not limited thereto. The bandwidth of the predetermined number of RBs is capable of being varied corresponding to the number of subcarriers constituting 1 RB and the subcarrier spacing.

For example, as shown in FIG. 3, when the subcarrier spacing is 15 kHz, 60 kHz or 240 kHz, the bandwidth per 1 PRB (=12 subcarriers) is 0.18 MHz, 0.72 MHz, or 2.88 MHz, respectively. Similarly, when the subcarrier spacing is 15 kHz, 60 kHz or 240 kHz, the bandwidth per 4 PRBs (=48 subcarriers) is 0.72 MHz, 2.88 MHz, or 11.52 MHz, respectively. Thus, as the subcarrier spacing is increased, the bandwidth per the predetermined number of RBs is also increased.

Herein, it is expected that a CC bandwidth of 200 MHz or the like wider than in the existing LTE system is used in a high frequency band of 28 GHz, etc. In high frequency bands of several tens of gigahertz or the like, in order to prevent inter-channel interference by Doppler shift when the user terminal shifts, and transmission quality deterioration by phase noise of the receiver of the user terminal, for example, it is expected to use subcarrier spacings of 60 kHz, 240 kHz, etc. larger than 15 kHz in the existing LTE system.

Since the bandwidth per the predetermined number of RBs is increased, as the subcarrier spacing is increased, also in the case of using the CC bandwidth wider than in the existing LTE system, it is possible to use the same allocation granularity of frequency resources as in the existing LTE system (Method (1)).

Specifically, in Method (1), as shown in FIG. 4A, also in the case where the number of RBs constituting the CC bandwidth is 111 or more, the RBG size may be set at 4 RBs. As described in FIG. 3, for example, in the case where the subcarrier spacing is 240 kHz, the bandwidth per 4 RBs (i.e. 1 RBG) is 11.52 MHz. In this case, also when the CC bandwidth is 200 MHz, the number of RBGs inside the CC bandwidth is 18. Accordingly, in the case of allocation in an RB unit, a bitmap of 70 bits is required, and in contrast thereto, in the case of allocation in an RBG unit comprised of 4 RBs, it is possible to allocate frequency resources with a bitmap of 18 bits.

Thus, by using a wider subcarrier spacing than in the existing LTE system, also in the case (Method (1)) of using the same allocation granularity as in the existing LTE system in a CC bandwidth wider than in the existing LTE system, it is possible to suppress increase the number of bits of DCI.

On the other hand, in the future radio communication system, in the case of using the same subcarrier spacing (15 kHz) as in the existing LTE system, it is also expected to use a CC bandwidth wider than the maximum CC bandwidth in the existing LTE system. For example, in the case of performing communication in a relatively low frequency band (hereinafter, low frequency band) that is a frequency (e.g., unlicensed band) lower than 6 GHz, it is expected to use a CC bandwidth wider than 100 MHz.

Then, in the case of using a CC bandwidth wider than in the existing LTE system, Method (2) may be used where the allocation granularity in the existing LTE system is modified. Specifically, in Method (2), as shown in FIG. 4B, in the case where the number of RBs constituting the CC bandwidth is 111 or more, the RBG size may be set at 8 RBs. In addition, setting of the RBG size shown in FIG. 4B is only an example, and is not limited to the sizes shown in FIG. 4B.

In the case where the subcarrier spacing is 15 kHz, the bandwidth per 8 RBs (i.e. 1 RBG) is 1.44 MHz. In this case, also when the CC bandwidth is 100 MHz, the number of RBGs inside the CC bandwidth is 56. Accordingly, in the case of allocation in an RB unit, a bitmap of 556 bits is required, and in contrast thereto, in the case of allocation in an RBG unit comprised of 8 RBs, it is possible to allocate frequency resources with a bitmap of 70 bits.

Thus, also in the case of using the same subcarrier spacing as in the existing LTE system in a CC bandwidth wider than in the existing LTE system, by using the allocation granularity larger than in the existing LTE system (Method (2)), it is possible to suppress increase in the number of bits of DCI.

As described above, in the future radio communication system using allocation granularity of frequency resources which is the same and/or different as/from that in the existing LTE system, in the case of co-existence of a plurality of signals to which different allocation granularity is applied inside the same CC bandwidth, there is the risk that spectral usage efficiency degrades.

Figure 5:
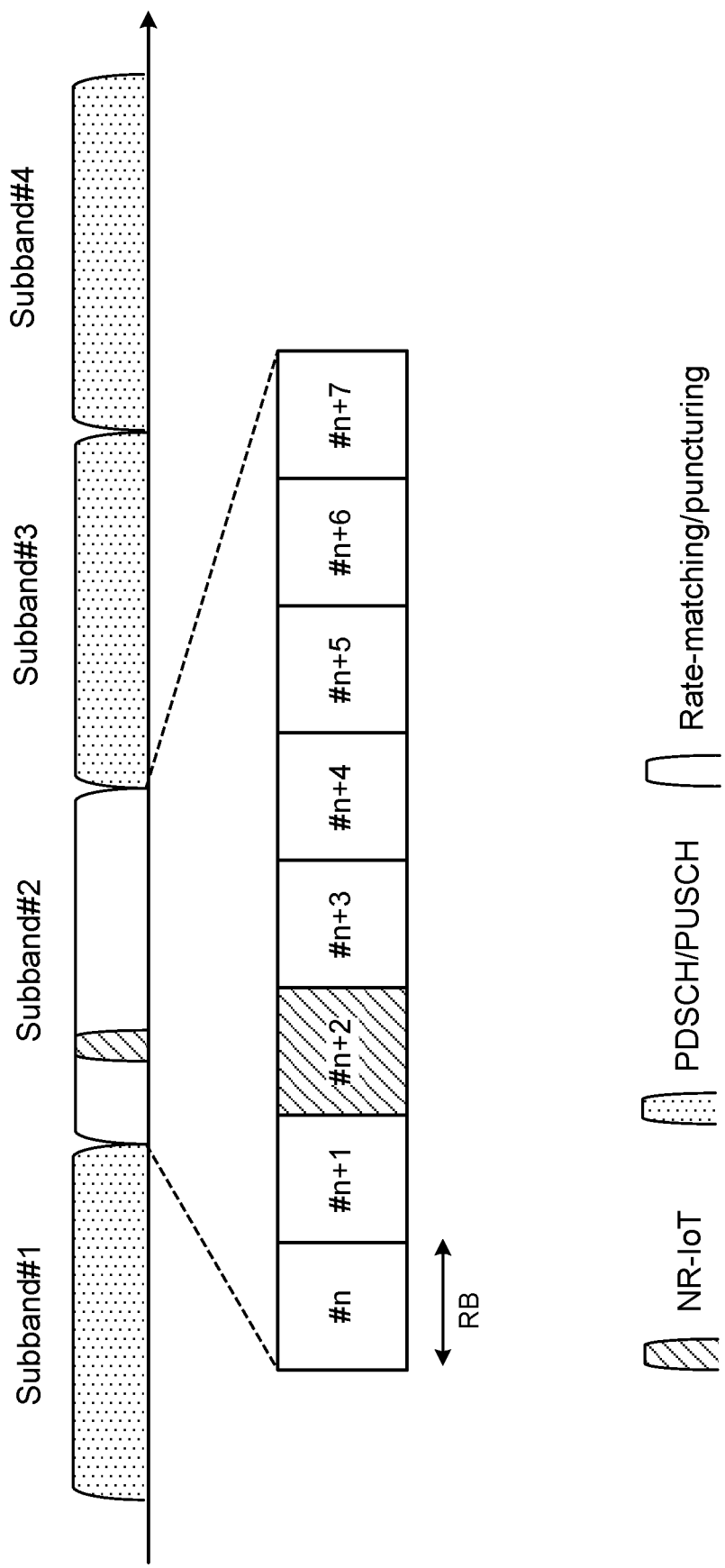
FIG. 5 is a diagram showing a control example of PDSCH/PUSCH when an interrupt occurs in a part inside RBG.

FIG. 5 is a diagram showing a control example of PDSCH/PUSCH when an interrupt occurs in a part inside the RBG (subband). In addition, in FIG. 5, it is assumed that the subband and the RBG are in a one-to-one correspondence with each other and that the subband (i.e., RBG) is comprised of 8 RBs, but the invention is not limited thereto. For example, a plurality of RBGs may be included inside one band. Further, the RBG size is not limited to 8 RBs either.

For example, in FIG. 5, subbands (RBGs) #1, #2, #3 and #4 are allocated to PDSCH/PUSCH. On the other hand, it is assumed that an interrupt by communication (e.g., NR-IoT) in a unit smaller than the RBG occurs in RB #n+2 inside the subband #2.

In FIG. 5, in the entire subband (RBG) #2 including RB #n+2 allocated to NR-IoT, the PDSCH/PUSCH is punctured. As a result, RBs #n, #n+1 and #n+3 to #n+7 inside the subband #2 are unused, and there is the risk that spectral usage efficiency degrades. Such a problem may occur in the case of using the same allocation granularity as in the existing LTE system (e.g., case where the RBG size is 4 RBs).

Then, in the future radio communication system using allocation granularity of frequency resources which is the same and/or different as/from that in the existing LTE system, the inventors of the present invention studied methods of improving spectral usage efficiency in the case of co-existence of a plurality of signals (e.g., PDSCH/PUSCH and NB-IoT, NR-IoT or the like) to which different allocation granularity is applied inside the same CC bandwidth, and arrived at the present invention.

One Embodiment of the present invention will be described below in detail with reference to drawings. In addition, in the following description, in this Embodiment, a first allocation unit that is a minimum allocation unit of frequency resources is called a resource block (RB), but the name of the first allocation unit is not limited thereto. Further, a second allocation unit comprised by including one or more RBs is called a resource block group (RBG), but the name of the second allocation unit is not limited thereto. Furthermore, each RB is comprised by including one or more subcarriers.

Moreover, in this Embodiment, as one example, it is assumed that a first signal allocated in an RBG unit comprised of a plurality of RBs is PDSCH/PUSCH, but the invention is not limited thereto. Further, as one example, a second signal allocated in an RB unit is NR-IoT, but the invention is not limited thereto.

Aspect 1

Aspect 1 describes the case where an interrupt by NR-IoT occurs at the same subcarrier spacing as in PUSCH/PDSCH inside frequency resource(s) allocated to the PUSCH/PDSCH.

Figure 6:
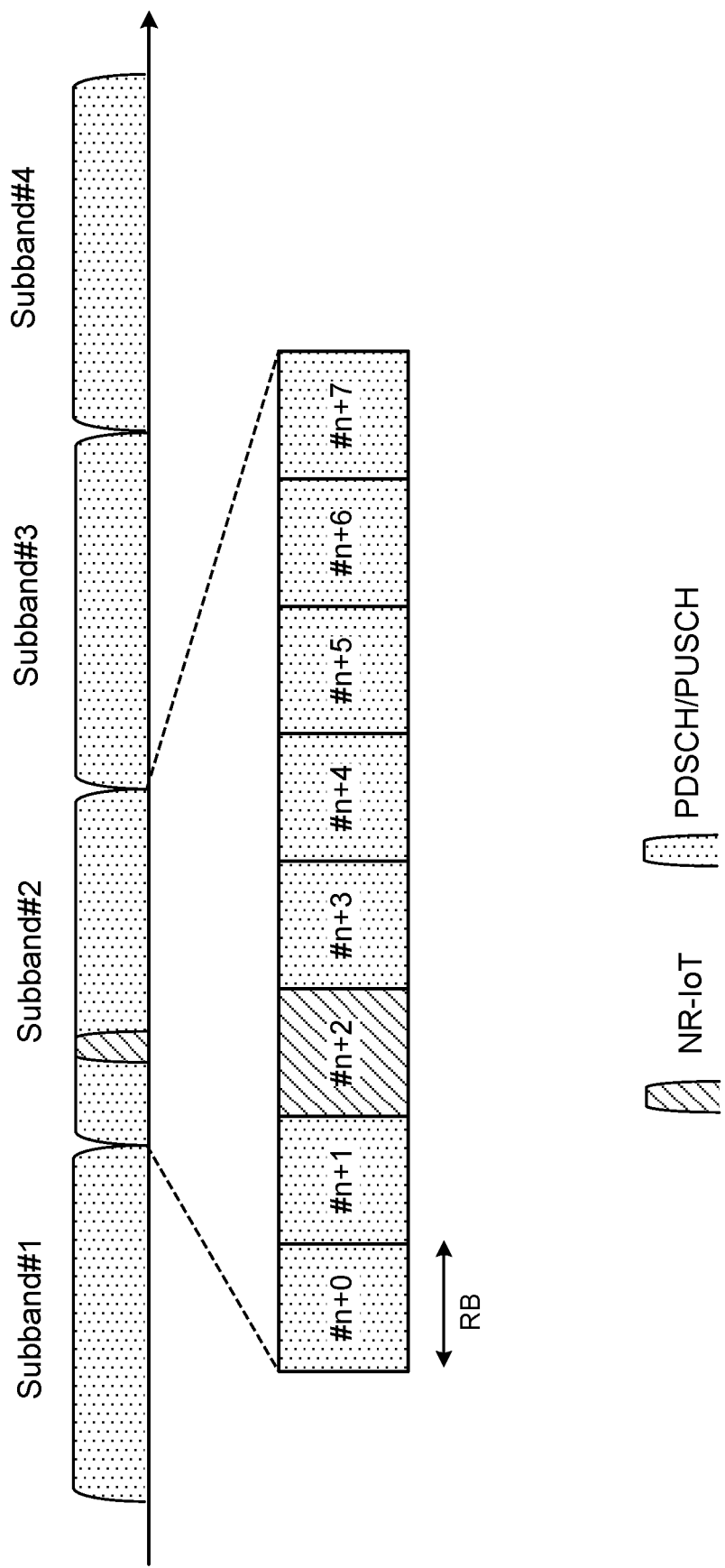
FIG. 6 is a diagram showing a control example of PDSCH/PUSCH according to Aspect 1.

FIG. 6 is a diagram showing a control example of PDSCH/PUSCH according to Aspect 1. In FIG. 6, it is assumed that subbands (RBGs) #1 to #4 are allocated to the PDSCH/PUSCH, and that RB #n+2 inside the subband #2 is allocated to NR-IoT.

Herein, the subband is one of feedback units of CSI, and is comprised of the predetermined number of RBs smaller than the CC bandwidth (wideband). The number of RBs (subband size) constituting the subband may be equal to or may be different from the number of RBs (RBG size) constituting the RBG that is an allocation unit (second allocation unit) of frequency resources with respect to the PDSCH/PUSCH.

In FIG. 6, it is assumed that the subband size is equal to the RBG size (e.g., 8 RBs in FIG. 6), and that the subband and the RBG are in a one-to-one correspondence with each other, and the subband and the RBG are handled to be synonymous with each other, but the invention is not limited thereto. For example, in the case where the subband and the RBG are defined independently as in the existing LTE system, the subband size may be larger than the RBG size, and a plurality of RBGs may be set inside the subband. Thus, in the future radio communication system, the subband and the RBG may be defined without distinguishing (the name is not limited to the subband or the RBG), or the subband and the RBG may be defined independently.

Further, in the subband size and/or the RBG size, a value corresponding to a CC bandwidth may be beforehand determined in specifications, or the value may be set by higher layer signaling (e.g., RRC (Radio Resource Control) signaling, system information such as MIB (Master Information Block) or SIB (System Information Block) and the like).

As shown in FIG. 6, in the case where NR-IoT is allocated to RB #n+2 inside subband #2 allocated to the PDSCH/PUSCH, in the RB #n+2, the PDSCH/PUSCH is subjected to rate-matching and/or puncturing.

Herein, rate-matching refers to controlling the number of bits (coded bits) subsequent to coding, in consideration of actually available frequency resource (s) among frequency resource (s) allocated to the PDSCH/PUSCH. When the number of coded bits is lower than the number of bits capable of being mapped to the actually available frequency resources, at least a part of the coded bits may be repeated. When the number of coded bits is higher than the number of bits capable of being mapped, a part of the coded bits may be deleted. For example, in FIG. 6, in consideration of the RB #n+2 for NB-IoT, a part of coded bits of the PDSCH/PUSCH may be deleted.

Further, puncturing refers to that a coded symbol is not mapped to actually unavailable resource(s) (e.g., resource element for a reference signal, RB #n+2 for NR-IoT in FIG. 6), while coding is performed without considering an unavailable resource amount among frequency resources allocated to the PDSCH/PUSCH.

Specifically, one or more candidate resources allocated to NR-IoT may be beforehand set by higher layer signaling. The candidate resources may be set in the subband (RBG) unit, or may be set in the RB unit.

Further, the DCI (also referred to as an L1/L2 control channel, physical layer signaling and the like) may indicate whether or not NR-IoT is allocated to candidate resources set by higher layer signaling (i.e., whether or not the PDSCH/PUSCH undergoes rate-matching and/or puncturing in the candidate resources). When a plurality of candidate resources is set by higher layer signaling, the DCI may indicate a candidate resource in which the PDSCH/PUSCH undergoes rate-matching and/or puncturing.

Based on the DCI, the user terminal determines the presence or absence of allocation of NR-IoT in the candidate resource, and performs reception processing (e.g., demapping, decoding and the like) of the PDSCH, or transmission processing (e.g., coding, mapping and the like) of the PUSCH.

For example, in FIG. 6, the RB #n+2 is set as a candidate resource by higher layer signaling, and the DCI indicates that NR-IoT is allocated in the RB #n+2. In FIG. 6, assuming that the PDSCH/PUSCH is not allocated to the RB #n+2 inside the subband #2 and is allocated to RBs except the RB #n+2, the user terminal performs the reception processing and/or the transmission processing of the PDSCH/PUSCH.

As described above, in Aspect 1, the PDSCH/PUSCH is subjected to rate-matching and/or puncturing in only the RB to which NB-IoT is allocated, instead of the entire subband where an interrupt by the NB-IoT occurs. Accordingly, in the case where NR-IoT is allocated in a part of RBs inside a subband allocated to the PDSCH/PUSCH, it is possible to improve spectral usage efficiency, as compared with the case of puncturing the PDSCH/PUSCH in the entire subband.

Aspect 2

Aspect 2 describes the case where an interrupt by NR-IoT occurs at a subcarrier spacing different from that of PUSCH/PDSCH inside frequency resource(s) allocated to the PUSCH/PDSCH. In addition, in Aspect 2, the description will be given with emphasis on differences from Aspect 1.
<First Control Example>

In a first control example, in the case where NR-IoT is allocated at a subcarrier spacing different from that of PUSCH/PDSCH in a part of a subband (or RBG) allocated to the PUSCH/PDSCH, in a subcarrier at least a part of which overlaps with the NR-IoT, the PDSCH/PUSCH is subjected to rate-matching and/or puncturing.

Figure 7:
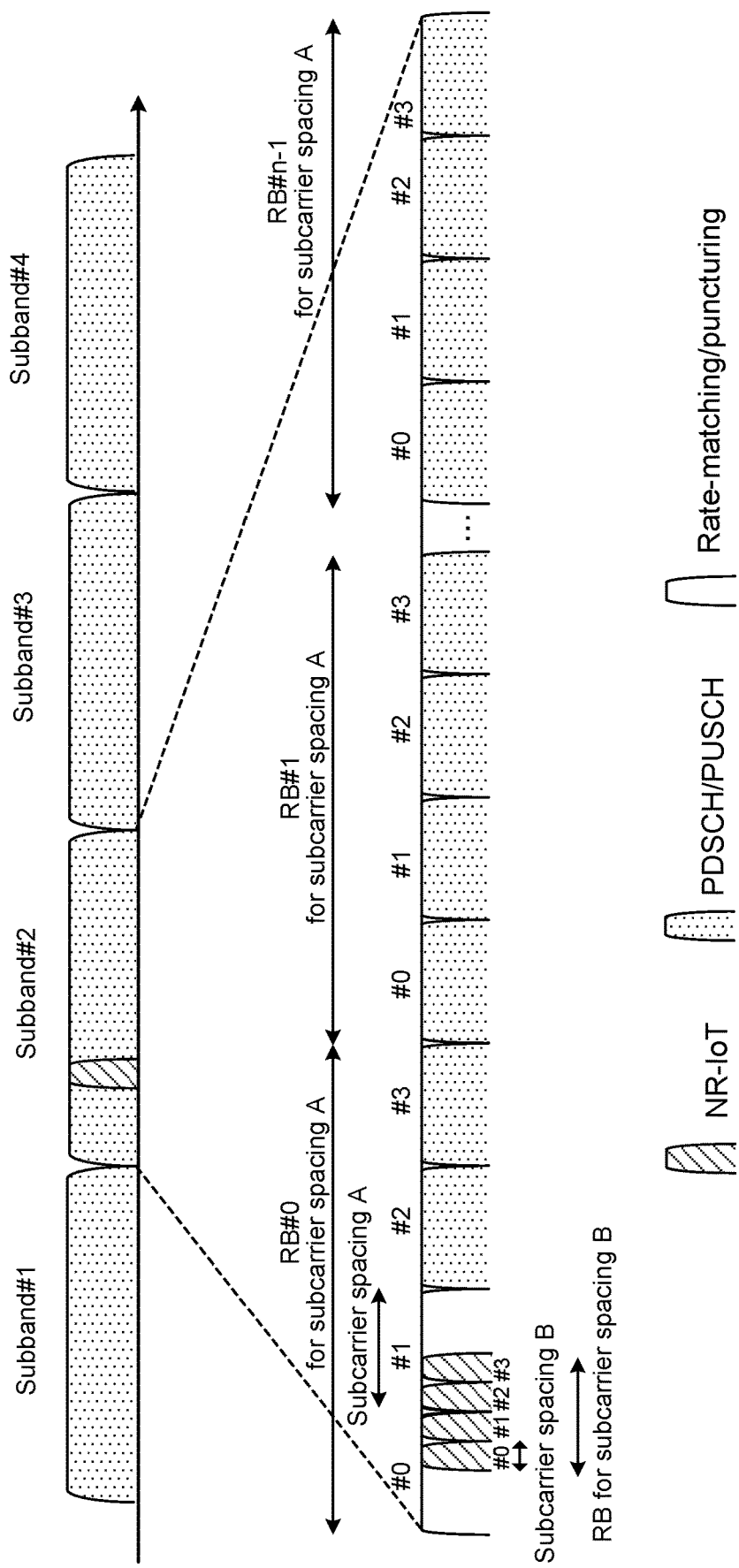
FIG. 7 is a diagram showing a first control example of PDSCH/PUSCH according to Aspect 2.

FIG. 7 is a diagram showing the first control example of PDSCH/PUSCH according to Aspect 2. In FIG. 7, as one example, it is assumed that each of subbands (RBGs) #1 to #4 allocated to the PDSCH/PUSCH is comprised of n–1 (n≥1) RBs, and that each RB is comprised of subcarriers #0 to #3 with subcarrier spacing A. Further, it is assumed that an RB allocated to NR-IoT is comprised of subcarriers #0 to #3 with subcarrier spacing B.

In addition, in FIG. 7, the number of subcarriers included in each of RBs #0 to #n–1 with subcarrier spacing A is assumed to "4", but is not limited thereto. Similarly, the number of subcarriers included in the RB with subcarrier spacing B is assumed to "4", but is not limited thereto.

In FIG. 7, the subcarrier spacing A for PDSCH/PUSCH is different from the subcarrier spacing B for NR-IoT. For example, the subcarrier spacing A may be 60 kHz, while the subcarrier spacing B may be 15 kHz, but the spacing is not limited thereto.

In FIG. 7, subcarriers #0 to #3 with the subcarrier spacing B for NR-IoT are allocated to a part of subcarriers #0 and #1 with the subcarrier spacing A constituting RB #0 of subband #2 allocated to the PDSCH/PUSCH.

In the case shown in FIG. 7, in the subcarriers #0 and #1 of the RB #0 with the subcarrier spacing A at least a part of which overlaps with the subcarriers #0 to #3 for NR-IoT, the PDSCH/PUSCH is subjected to rate-matching and/or puncturing. On the other hand, in subcarriers #2 and #3 of the RB #0 which do not overlap with the subcarriers #0 to #3 for NR-IoT, and RBs #1 to #n, the PDSCH/PUSCH is not punctured, and is disposed.

In addition, the subcarrier (subcarriers #0 and #1 of the RB #0, in FIG. 7) in which the PDSCH/PUSCH is subjected to rate-matching and/or puncturing is preferably designated by higher layer signaling and/or DCI.

In the first control example, the PDSCH/PUSCH is subjected to rate-matching and/or puncturing in only a subcarrier at least a part of which overlaps with a subcarrier for NB-IoT, instead of the entire subband which the NB-IoT interrupts. Accordingly, in the case where NR-IoT with the subcarrier spacing different from that of the PDSCH/PUSCH is allocated in apart inside a subband allocated to the PDSCH/PUSCH, it is possible to improve spectral usage efficiency, as compared with the case of puncturing the PDSCH/PUSCH in the entire subband.
<Second Control Example>

In a second control example, in the case where NR-IoT is allocated at a subcarrier spacing different from that of PUSCH/PDSCH in a part of a subband (or RBG) allocated to the PUSCH/PDSCH, in an RB including a subcarrier at least a part of which overlaps with the NR-IoT, the PDSCH/PUSCH is subjected to rate-matching and/or puncturing.

Figure 8:
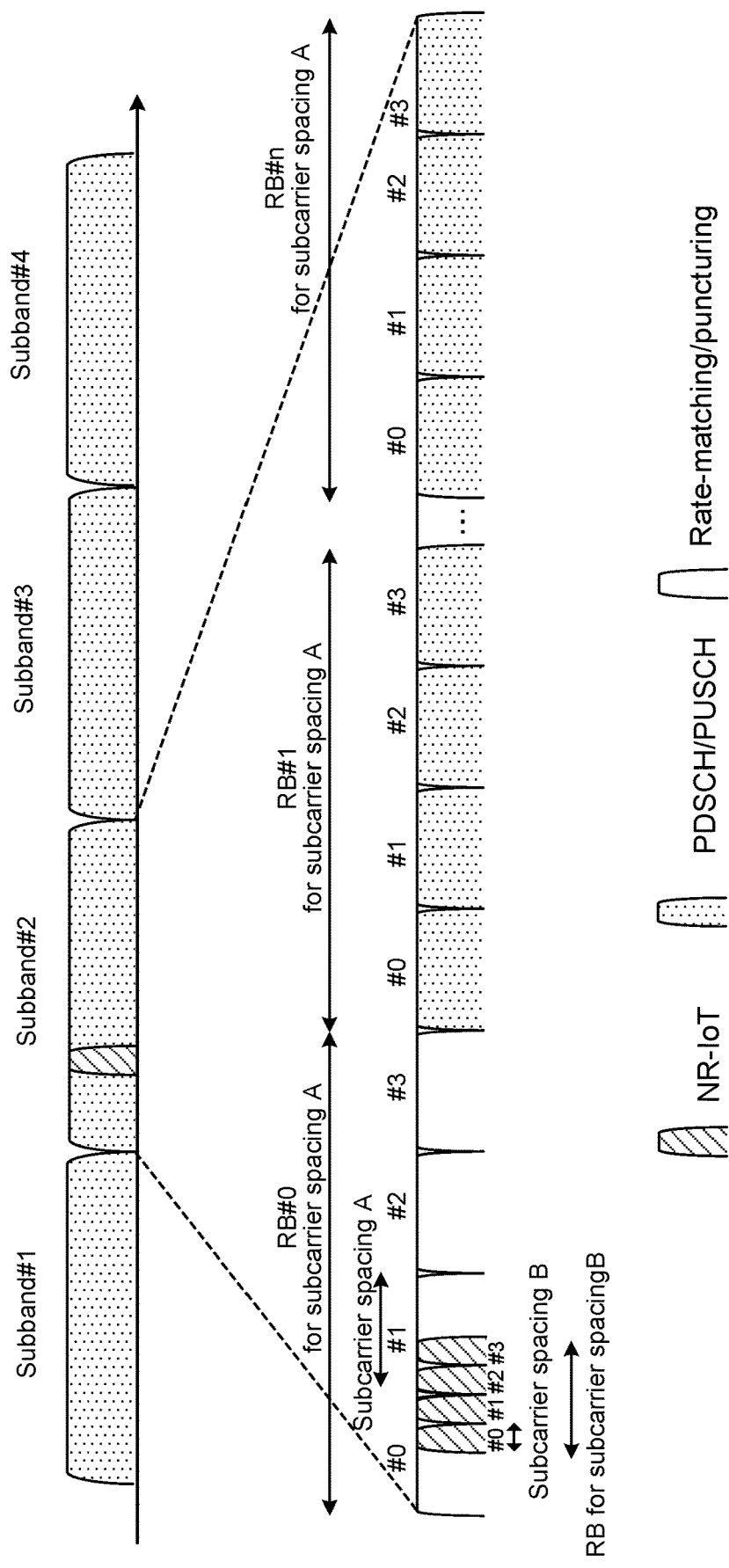
FIG. 8 is a diagram showing a second control example of PDSCH/PUSCH according to Aspect 2.

FIG. 8 is a diagram showing the second control example of PDSCH/PUSCH according to Aspect 2. In FIG. 8, as in FIG. 7, subcarriers #0 to #3 with the subcarrier spacing B for NR-IoT are allocated to a part of subcarriers #0 and #1 with the subcarrier spacing A constituting RB #0 of subband #2.

In FIG. 8, in the RB #0 including the subcarriers #0 and #1 with the subcarrier spacing A at least a part of which overlaps with the subcarriers #0 to #3 for NR-IoT, the PDSCH/PUSCH is subjected to rate-matching and/or puncturing. On the other hand, in RBs #1 to #n which do not overlap with the subcarriers #0 to #3 for NR-IoT, the PDSCH/PUSCH is not punctured, and is disposed.

In addition, the RB (RB #0, in FIG. 8) in which the PDSCH/PUSCH is subjected to rate-matching and/or puncturing is preferably designated by higher layer signaling and/or DCI.

In the second control example, the PDSCH/PUSCH is subjected to rate-matching and/or puncturing in only an RB including a subcarrier at least apart of which overlaps with a subcarrier for NB-IoT, instead of the entire subband which the NB-IoT interrupts. Accordingly, in the case where NR-IoT with the subcarrier spacing different from that of the PDSCH/PUSCH is allocated in a part inside a subband allocated to the PDSCH/PUSCH, it is possible to improve spectral usage efficiency, as compared with the case of puncturing the PDSCH/PUSCH in the entire subband.

<Third Control Example>

In a third control example, in the case where NR-IoT is allocated at a subcarrier spacing different from that of PUSCH/PDSCH in a part of a subband (or RBG) allocated to the PUSCH/PDSCH, the PDSCH/PUSCH is subjected to rate-matching and/or puncturing in the entire subband (or RBG).

Figure 9:
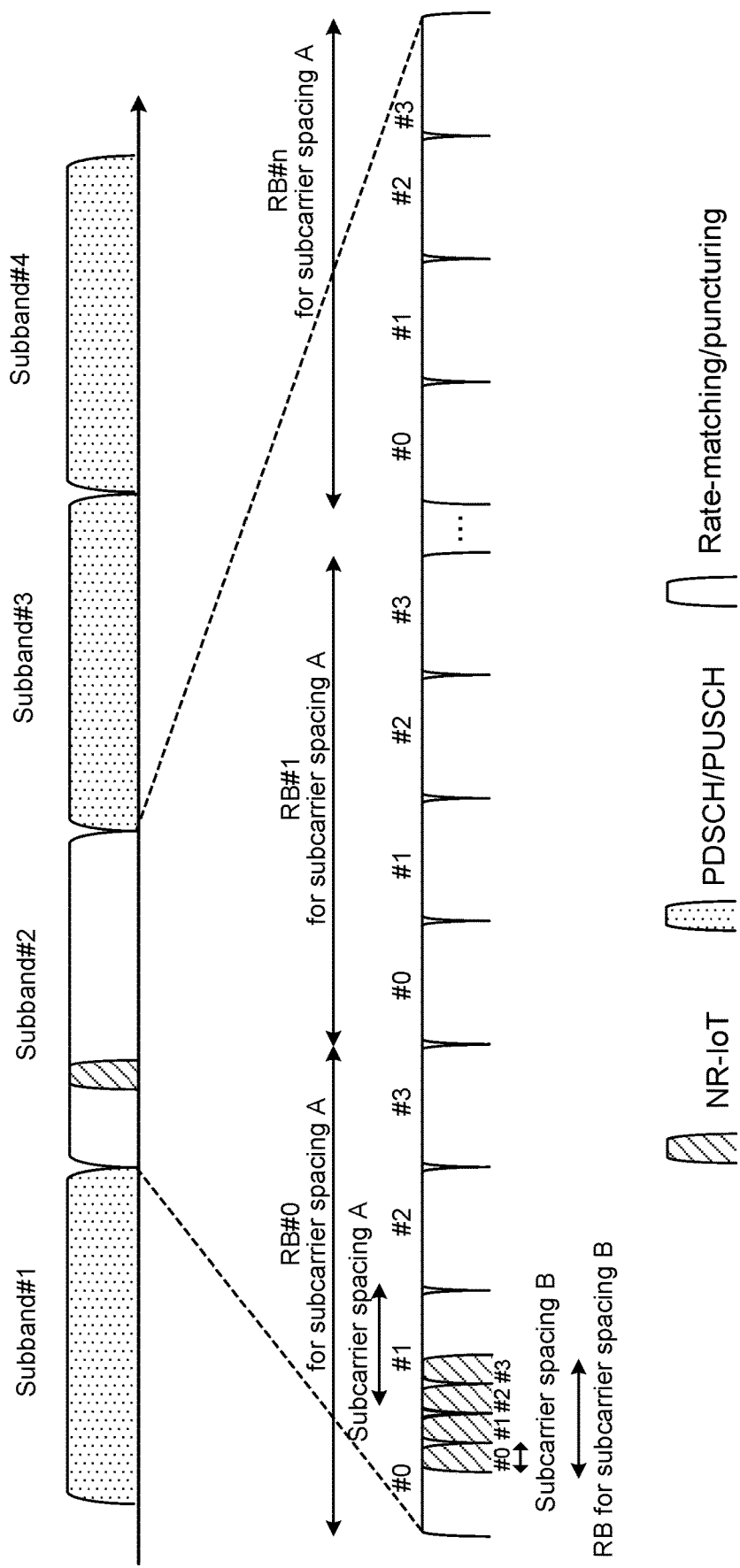
FIG. 9 is a diagram showing a third control example of PDSCH/PUSCH according to Aspect 2.

FIG. 9 is a diagram showing the third control example of PDSCH/PUSCH according to Aspect 2. In FIG. 9, as in FIG. 7, subcarriers #0 to #3 with the subcarrier spacing B for NR-IoT are allocated to a part of subcarriers #0 and #1 with the subcarrier spacing A constituting RB #0 of subband #2.

In FIG. 9, in the entire subband #2 including the subcarriers #0 and #1 with the subcarrier spacing A at least a part of which overlaps with the subcarriers #0 to #3 for NR-IoT, the PDSCH/PUSCH is punctured.

In addition, the subband (or RBG) (subband #2, in FIG. 8) in which the PDSCH/PUSCH is punctured is preferably designated by higher layer signaling and/or DCI.

In the third control example, in the case where NR-IoT with a subcarrier spacing different from that of PUSCH/PDSCH is allocated in a part inside a subband allocated to the PDSCH/PUSCH, the user terminal is capable of properly performing reception processing and/or transmission processing of the PDSCH/PUSCH.

(Radio Communication System)

A configuration of a radio communication system according to this Embodiment will be described below. In the radio communication system, the radio communication method according to each of the above-mentioned Aspects is applied. In addition, the radio communication method according to each of the above-mentioned Aspects may be used alone or may be used in combination thereof.

Figure 10:
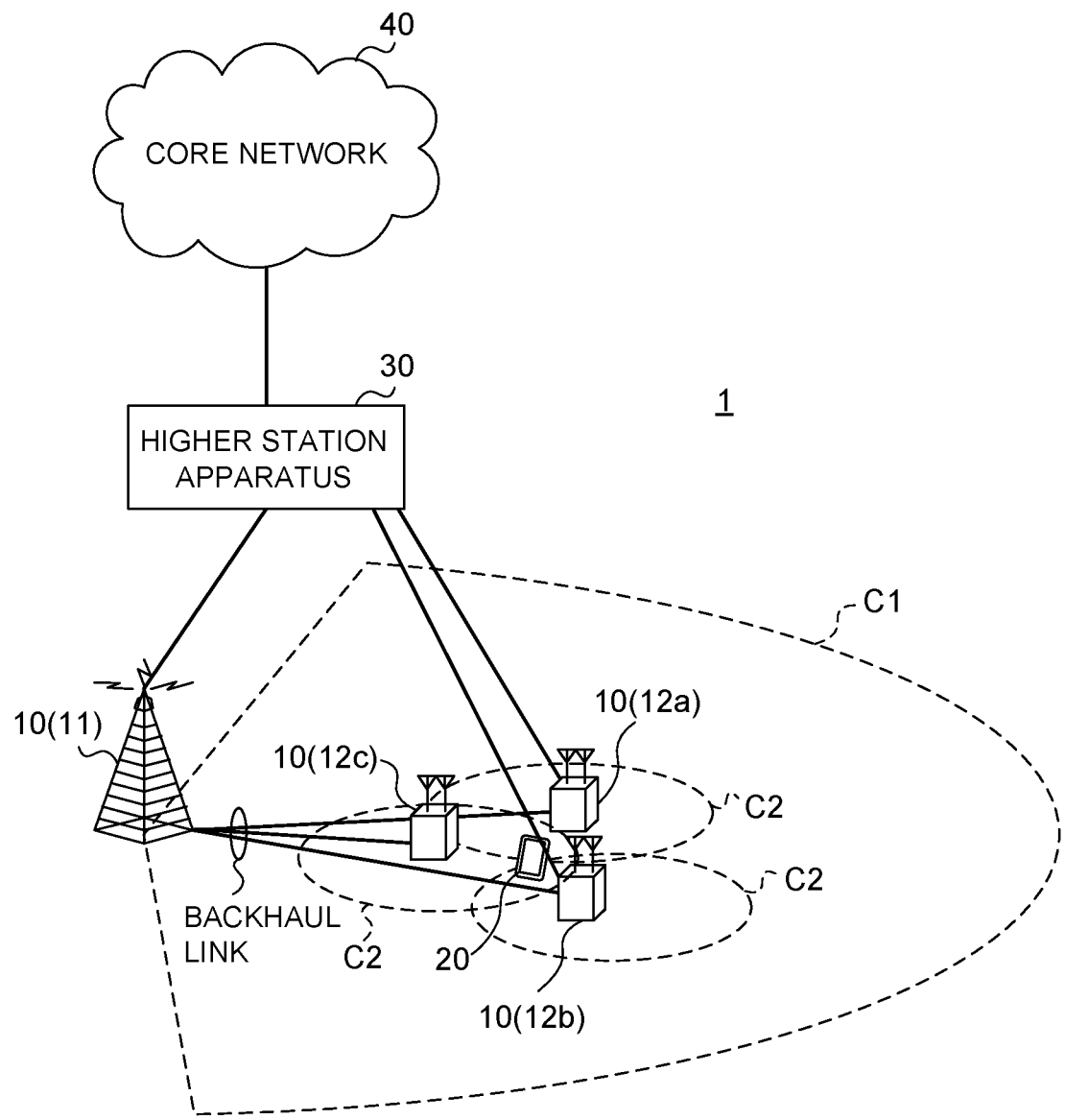
FIG. 10 is a diagram showing one example of a schematic configuration of a radio communication system according to this Embodiment.

FIG. 10 is a diagram showing one example of a schematic configuration of the radio communication system according to this Embodiment. In the radio communication system 1, it is possible to apply carrier aggregation (CA) to aggregate a plurality of base frequency blocks (component carriers) with a system bandwidth (e.g., 20 MHz) of the LTE system as one unit and/or dual connectivity (DC). In addition, the radio communication system 1 may be called SUPER 3G, LTE-A (LTE-Advanced), IMT-Advanced, 4G, 5G, FRA (Future Radio Access), NR (New Rat) and the like.

The radio communication system 1 shown in FIG. 10 is provided with a radio base station 11 for forming a macrocell C1, and radio base stations 12a to 12c disposed inside the macrocell C1 to form small cells C2 narrower than the macrocell C1. Further, a user terminal 20 is disposed in the macrocell C1 and each of the small cells C2. Such a configuration may be made that different numerology is applied between cells.

Herein, the numerology refers to communication parameters in the frequency domain and/or time domain (e.g., at least one of the subcarrier spacing, bandwidth, symbol length, CP length, TTI length, the number of symbols per TTI, radio frame configuration, filtering processing, windowing processing and the like).

The user terminal 20 is capable of connecting to both the radio base station 11 and the radio base station 12. The user terminal 20 is assumed to concurrently use the macrocell C1 and small cell C2 using different frequencies by CA or DC. Further, the user terminal 20 is capable of applying CA or DC using a plurality of cells (CCs) (e.g. two or more CCs). Furthermore, the user terminal is capable of using a licensed band CC and an unlicensed band CC as a plurality of cells.

Further, the user terminal 20 is capable of communicating using Time Division Duplex (TDD) or Frequency Division Duplex (FDD) in each cell. The cell of TDD and the cell of FDD may be respectively called a TDD carrier (Frame structure type 2), FDD carrier (Frame structure type 1) and the like.

Furthermore, in each cell (carrier), one of a subframe (also referred to as TTI, ordinary TTI, long TTI, ordinary subframe, long subframe and the like) having a relatively long time length (e.g., 1 ms) and a subframe (also referred to as short TTI, short subframe and the like) having a relatively short time length may be applied, or both the long subframe and the short subframe may be used. Further, in each cell, subframes with two or more time lengths may be applied.

The user terminal 20 and radio base station 11 are capable of communicating with each other using a relatively narrow subcarrier spacing in a relatively low frequency band (e.g., 2 GHz, 3.5 GHz, 5 GHz, 6 GHz and the like). On the other hand, the user terminal 20 and radio base station 12 may use a relatively wide subcarrier spacing in a relatively high frequency band (e.g. 28 GHz, 30~70 GHz and the like), or may use the same carrier as in the radio base station 11. In addition, the configuration of the frequency band used in each radio base station is not limited thereto.

It is possible to configure so that the radio base station 11 and radio base station 12 (or, two radio base stations 12) undergo wired connection (e.g., optical fiber in conformity with CPRI (Common Public Radio Interface), X2 interface and the like), or wireless connection.

The radio base station 11 and each of the radio base stations 12 are relatively connected to a higher station apparatus 30, and are connected to a core network 40 via the higher station apparatus 30. In addition, for example, the higher station apparatus 30 includes an access gateway apparatus, Radio Network Controller (RNC), Mobility Management Entity (MME) and the like, but is not limited thereto. Further, each of the radio base stations 12 may be connected to the higher station apparatus 30 via the radio base station 11.

In addition, the radio base station 11 is a radio base station having relatively wide coverage, and may be called a macro base station, collection node, eNB (eNodeB), transmission/reception point and the like. Further, the radio base station 12 is a radio base station having local coverage, and may be called a small base station, micro-base station, pico-base station, femto-base station, HeNB (Home eNodeB), RRH (Remote Radio Head), transmission/reception point and the like. Hereinafter, in the case of not distinguishing between the radio base stations 11 and 12, the stations are collectively called a radio base station 10.

Each user terminal 20 is a terminal supporting various communication schemes such as LTE and LTE-A, and may include a fixed communication terminal, as well as the mobile communication terminal. Further, the user terminal 20 is capable of performing device-to-device communication (D2D) with another user terminal 20.

In the radio communication system 1, as radio access schemes, it is possible to apply OFDMA (Orthogonal Frequency Division Multiple Access) on downlink (DL), and it is possible to apply SC-FDMA (Single Carrier-Frequency Division Multiple Access) on uplink (UL). OFDMA is a multicarrier transmission scheme for dividing a frequency band into a plurality of narrow frequency bands (subcarriers), and mapping data to each subcarrier to perform communication. SC-FDMA is a single-carrier transmission scheme for dividing a system bandwidth into bands comprised of a single or contiguous resource blocks for each terminal so that a plurality of terminals uses mutually different bands, and thereby reducing interference among terminals. In addition, uplink and downlink radio access schemes are not limited to the combination of the schemes, and OFDMA may be used on UL.

As DL channels, in the radio communication system 1 are used a DL shared channel (PDSCH: Physical Downlink Shared Channel, also referred to as a DL data channel and the like) shared by user terminals 20, broadcast channel (PBCH: Physical Broadcast Channel), L1/L2 control channels and the like. User data, higher layer control information, SIB (System Information Block) and the like are transmitted on the PDSCH. Further, MIB (Master Information Block) is transmitted on the PBCH.

The L1/L2 control channel includes DL control channels (PDCCH (Physical Downlink Control Channel), EPDCCH (Enhanced Physical Downlink Control channel)), PCFICH (Physical Control Format Indicator Channel), PHICH (Physical Hybrid-ARQ Indicator Channel) and the like. The downlink control information (DCI) including scheduling information of the PDSCH and PUSCH and the like is transmitted on the PDCCH. The number of OFDM symbols used in the PDCCH is transmitted on the PCFICH. The EPDCCH is frequency division multiplexed with the PDSCH to be used in transmitting the DCI and the like as the PDCCH. It is possible to transmit retransmission control information (A/N, HARQ-ACK) of the PUSCH on at least one of the PHICH, PDCCH and EPDCCH.

As UL channels, in the radio communication system 1 are used the UL shared channel (PUSCH: Physical Uplink Shared Channel, also referred to as a UL data channel and the like) shared by user terminals 20, UL control channel (PUCCH: Physical Uplink Control Channel), random access channel (PRACH: Physical Random Access Channel) and the like. User data and higher layer control information is transmitted on the PUSCH. Uplink control information (UCI) including at least one of retransmission control information (A/N, HARQ-ACK) of the PDSCH, channel state information (CSI) and the like is transmitted on the PUSCH or the PUCCH. It is possible to transmit a random access preamble to establish connection with the cell on the PRACH.

Further, in the radio communication system 1, a DL shared channel (NPDSCH: Narrowband Physical Downlink Shared Channel) for a narrowband (e.g., 1 PRB) and UL shared channel (NPUSCH: Narrowband Physical Uplink Shared Channel) for a narrow band may be used. The NPDSCH and NPUSCH may be used in NB-IoT and NR-IoT.

<Radio Base Station>

Figure 11:
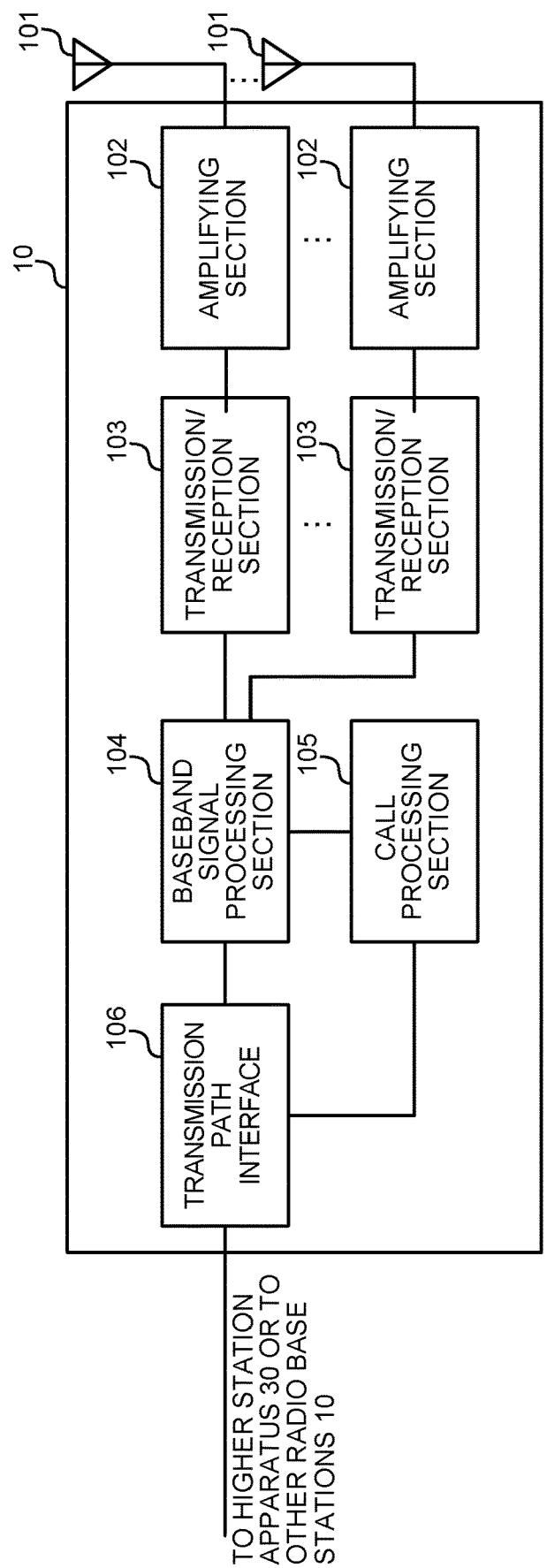
FIG. 11 is a diagram showing one example of an entire configuration of a radio base station according to this Embodiment.

FIG. 11 is a diagram showing one example of an entire configuration of the radio base station according to this Embodiment. The radio base station 10 is provided with a plurality of transmission/reception antennas 101, amplifying sections 102, transmission/reception sections 103, baseband signal processing section 104, call processing section 105, and transmission path interface 106. In addition, with respect to each of the transmission/reception antenna 101, amplifying section 102, and transmission/reception section 103, the radio base station may be configured to include at least one or more.

User data to transmit to the user terminal 20 from the radio base station 10 on downlink is input to the baseband signal processing section 104 from the higher station apparatus 30 via the transmission path interface 106.

The baseband signal processing section 104 performs, on the user data, transmission processing such as processing of PDCP (Packet Data Convergence Protocol) layer, segmentation and concatenation of the user data, transmission processing of RLC (Radio Link Control) layer such as RLC retransmission control, MAC (Medium Access Control) retransmission control (e.g., processing of HARQ (Hybrid Automatic Repeat reQuest)), scheduling, transmission format selection, channel coding, rate-matching, scrambling, Inverse Fast Fourier Transform (IFFT) processing, and precoding processing to transfer to the transmission/reception sections 103. Further, also concerning a downlink control signal, the section 104 performs transmission processing such as channel coding and Inverse Fast Fourier Transform on the signal to transfer to the transmission/reception sections 103.

Each of the transmission/reception sections 103 converts the baseband signal, which is subjected to precoding for each antenna and is output from the baseband signal processing section 104, into a signal with a radio frequency band to transmit. The radio-frequency signal subjected to frequency conversion in the transmission/reception section 103 is amplified in the amplifying section 102, and is transmitted from the transmission/reception antenna 101 as a DL signal.

The section 103 is capable of being comprised of a transmitter/receiver, transmission/reception circuit or transmission/reception apparatus explained based on common recognition in the technical field according to the present invention. In addition, the transmission/reception section 103 may be comprised as an integrated transmission/reception section, or may be comprised of a transmission section and reception section.

On the other hand, for UL signals, radio-frequency signals received in the transmission/reception antennas 101 are amplified in the amplifying sections 102. The transmission/reception section 103 receives the UL signal amplified in the amplifying section 102. The transmission/reception section 103 performs frequency conversion on the received signal into a baseband signal to output to the baseband signal processing section 104.

For UL data included in the input UL signal, the baseband signal processing section 104 performs Fast Fourier Transform (FFT) processing, Inverse Discrete Fourier Transform (IDFT) processing, error correcting decoding, reception processing of MAC retransmission control, and reception processing of RLC layer and PDCP layer to transfer to the higher station apparatus 30 via the transmission path interface 106. The call processing section 105 performs call processing such as setting and release of a communication channel, state management of the radio base station 10, and management of radio resources.

The transmission path interface 106 transmits and receives signals to/from the higher station apparatus 30 via a predetermined interface. Further, the transmission path interface 106 may transmit and receive signals (backhaul signaling) to/from an adjacent radio base station 10 via an inter-base station interface (e.g., optical fiber in conformity with CPRI (Common Public Radio Interface), X2 interface).

Further, the transmission/reception section 103 transmits and/or receives a first signal (e.g., PDSCH/PUSCH). Furthermore, the transmission/reception section 103 transmits and/or receives a second signal (e.g., NR-IoT, NB-IoT and the like).

Moreover, the transmission/reception section 103 may transmit information about candidate recourses for the second signal. Further, the transmission/reception section 103 may transmit downlink control signal (DCI) indicating whether or not the second signal is allocated in the candidate resources (Aspect 1).

Further, the transmission/reception section 103 may transmit information about frequency resources (e.g., subcarrier, RB or RBG (subband)) in which the first signal is subjected to rate-matching and/or puncturing by higher layer signaling and/or DCI (Aspect 2).

Figure 12:
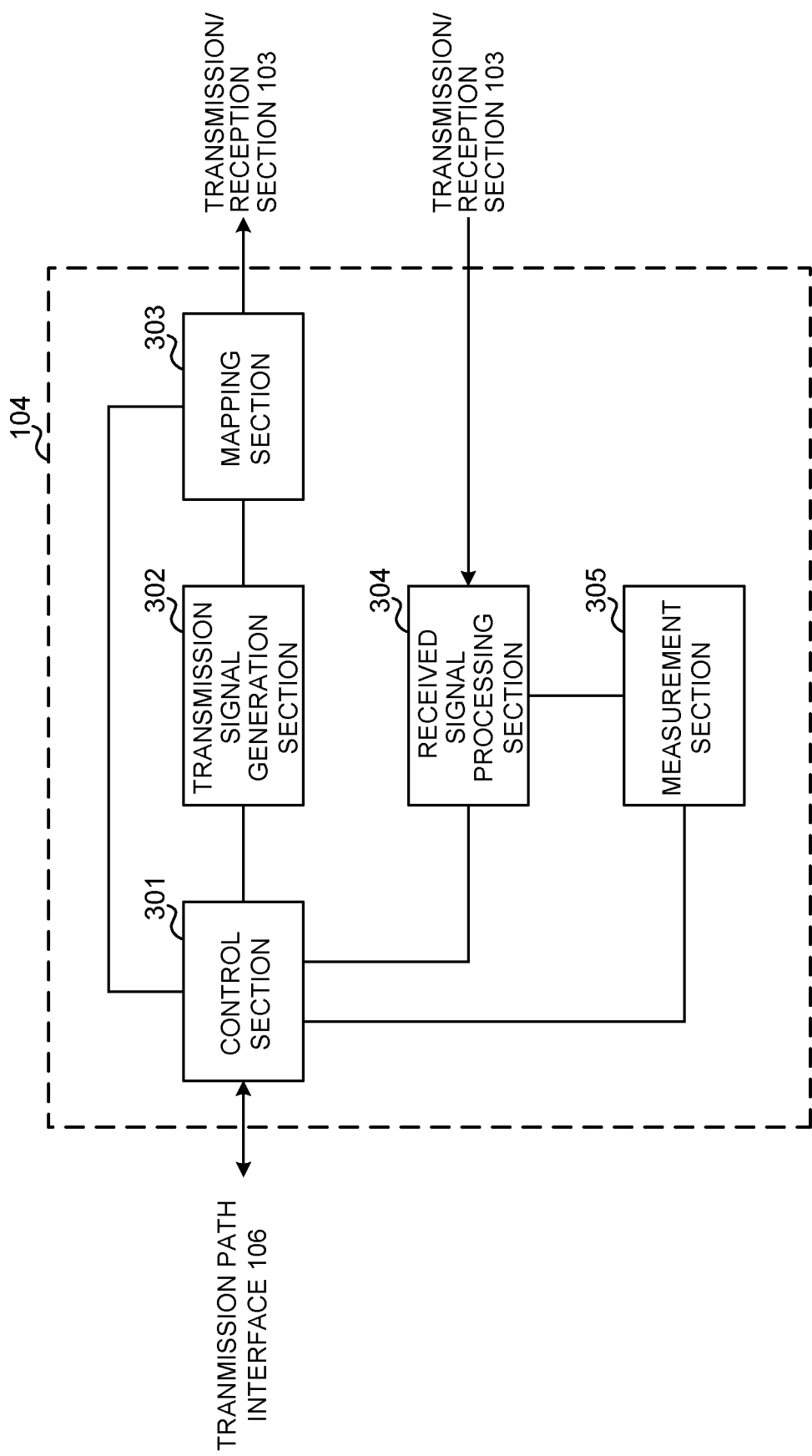
FIG. 12 is a diagram showing one example of a function configuration of the radio base station according to this Embodiment.

FIG. 12 is a diagram showing one example of a function configuration of the radio base station according to this Embodiment. In addition, FIG. 12 mainly illustrates function blocks of a characteristic portion in this Embodiment, and the radio base station 10 is assumed to have other function blocks required for radio communication. As shown in FIG. 12, the baseband signal processing section 104 is provided with at least a control section 301, transmission signal generating section 302, mapping section 303, received signal processing section 304, and measurement section 305.

The control section 301 performs control of the entire radio base station 10. For example, the control section 301 controls scheduling of the first and second signals, generation processing (e.g., coding, modulation, mapping and the like) of the first and second signals by the transmission signal generating section 302, mapping of the first and second signals by the mapping section 303, reception processing (e.g., demapping, demodulation, decoding and the like) of the first and second signals by the received signal processing section 304, and measurement by the measurement section 305.

Specifically, the control section 301 may allocate frequency resources for the first signal (e.g., PDSCH/PUSCH), using the second allocation unit (e.g., resource block group (RBG)) comprised by including a plurality of first allocation units (e.g., resource blocks (RBs)) that are minimum allocation units of frequency resources.

Herein, when the CC bandwidth (system bandwidth) exceeds the maximum value (20 MHz) of the existing LTE system, the number of RBs (RBG size) constituting the RBG may be the same as the maximum number (i.e. 4) of RBs constituting the RBG in the existing system, or may be larger than 4.

Further, the control section 301 may allocate frequency resources for the second signal (e.g., NR-IoT, NB-IoT), using a frequency unit (e.g., RB) smaller than the second allocation unit (RBG). Furthermore, to the second signal, the control section 301 may allocate frequency resources with the same subcarrier spacing as that of the first signal (Aspect 1), or may allocate frequency resources with a subcarrier spacing different from that of the first signal (Aspect 2).

Furthermore, the control section 301 may control rate-matching and/or puncturing of the first signal (e.g., PDSCH/PUSCH). For example, when the second signal (e.g., NR-IoT) is allocated to a part of frequency resources (e.g., RBG, subband) allocated to the first signal, the control section 301 may control rate-matching and/or puncturing of the first signal in a subcarrier at least a part of which overlaps with the second signal (FIG. 7).

Alternatively, in the same case, the control section 301 may control rate-matching and/or puncturing of the first signal in an RB at least a part of which overlaps with the second signal (FIGS. 6 and 8). Alternatively, in the same case, the control section 301 may control rate-matching and/or puncturing of the first signal in an RBG (or subband) at least a part of which overlaps with the second signal (FIG. 9).

Further, the control section 301 may control the transmission signal generating section 302, mapping section 303, and transmission/reception section 103 so as to set candidate resources for the second signal, generate information about the candidate resources, and transmit by higher layer signaling. Furthermore, the control section 301 may control the transmission signal generating section 302, mapping section 303, and transmission/reception section 103 so as to generate and transmit DCI indicating whether or not the second signal is allocated in the set candidate resources.

Moreover, the control section 301 may control the transmission signal generating section 302, mapping section 303, and transmission/reception section 103 so as to transmit information about frequency resources (e.g., subcarrier, RB or RBG (or subband)) in which the first signal is subjected to rate-matching and/or puncturing by higher layer signaling and/or DCI.

The control section 301 is capable of being comprised of a controller, control circuit or control apparatus explained based on the common recognition in the technical field according to the present invention.

Based on instructions from the control section 301, the transmission signal generating section 302 may generate at least one of the first and second signals, information subjected to higher layer signaling, and DCI to output to the mapping section 303.

The transmission signal generating section 302 is capable of being a signal generator, signal generating circuit or signal generating apparatus explained based on the common recognition in the technical field according to the present invention.

Based on instructions from the control section 301, the mapping section 303 maps the signal generated in the transmission signal generating section 302 to predetermined radio resources to output to the transmission/reception section 103. The mapping section 303 is capable of being a mapper, mapping circuit or mapping apparatus explained based on the common recognition in the technical field according to the present invention.

The received signal processing section 304 performs reception processing (e.g., demapping, demodulation, decoding and the like) of the first and second signals transmitted from the user terminal 20. For example, based on instructions from the control section 301, the received signal processing section 304 may perform decoding processing in a CB unit.

Further, the received signal processing section 304 may output the received signal and signal subjected to the reception processing to the measurement section 305. The measurement section 305 performs measurement on the received signal. The measurement section 305 is capable of being comprised of a measurement device, measurement circuit or measurement apparatus explained based on the common recognition in the technical field according to the present invention.

For example, the measurement section 305 may measure received power (e.g., RSRP (Reference Signal Received Power)), received quality (e.g. RSRQ (Reference Signal Received Quality)), channel state and the like of the received signal. The measurement result may be output to the control section 301.

<User Terminal>

Figure 13:
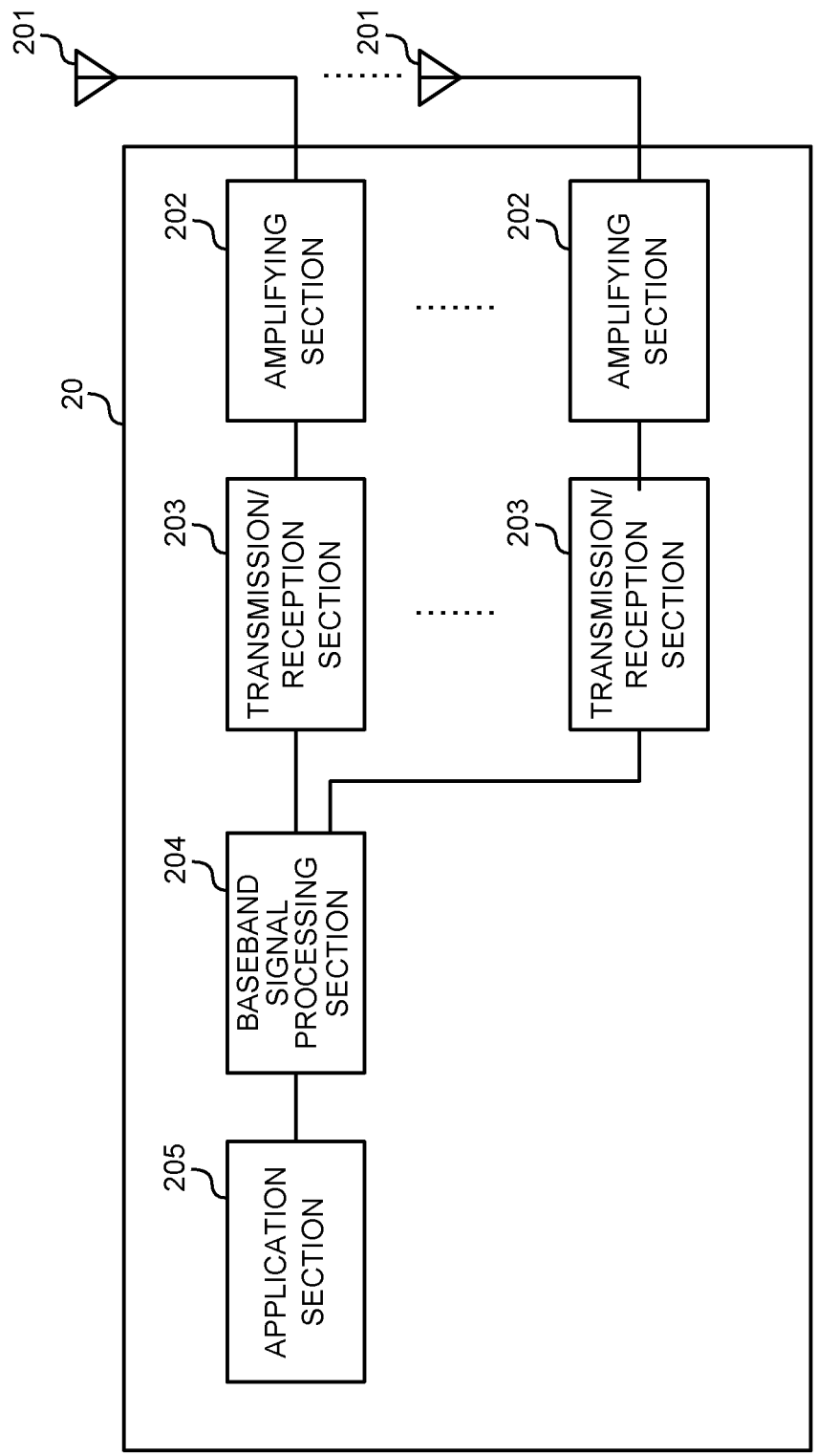
FIG. 13 is a diagram showing one example of an entire configuration of a user terminal according to this Embodiment.

FIG. 13 is a diagram showing one example of an entire configuration of the user terminal according to this Embodiment. The user terminal 20 is provided with a plurality of transmission/reception antennas 201 for MIMO transmission, amplifying sections 202, transmission/reception sections 203, baseband signal processing section 204, and application section 205.

Radio-frequency signals received in a plurality of transmission/reception antennas 201 are respectively amplified in the amplifying sections 202. Each of the transmission/reception sections 203 receives the DL signal amplified in the amplifying section 202. The transmission/reception section 203 performs frequency conversion on the received signal into a baseband signal to output to the baseband signal processing section 204.

The baseband signal processing section 204 performs FFT processing, error correcting decoding, reception processing of retransmission control and the like on the input baseband signal. The DL data is transferred to the application section 205. The application section 205 performs processing concerning layers higher than the physical layer and MAC layer, and the like.

On the other hand, for the UL data, the data is input to the baseband signal processing section 204 from the application section 205. The baseband signal processing section 204 performs retransmission control processing (e.g., processing of HARQ), channel coding, rate-matching, puncturing, Discrete Fourier Transform (DFT) processing, IFFT processing and the like to transfer to each of the transmission/reception sections 203. Also for the UCI, the section performs channel coding, rate-matching, puncturing, DFT processing, IFFT processing and like to output to each of the transmission/reception sections 203.

Each of the transmission/reception sections 203 converts the baseband signal output from the baseband signal processing section 204 into a signal with a radio frequency band to transmit. The radio-frequency signals subjected to frequency conversion in the transmission/reception sections 203 are amplified in the amplifying sections 202, and are transmitted from the transmission/reception antennas 201, respectively.

Further, the transmission/reception section 203 transmits and/or receives the first signal (e.g., PDSCH/PUSCH). Furthermore, the transmission/reception section 203 transmits and/or receives the second signal (e.g., NR-IoT, NB-IoT and the like).

Moreover, the transmission/reception section 203 may receive the information about candidate recourses for the second signal. Further, the transmission/reception section 203 may receive the downlink control signal (DCI) indicating whether or not the second signal is allocated in the candidate resources (Aspect 1).

Further, the transmission/reception section 203 may receive the information about frequency resources (e.g., subcarrier, RB or RBG (subband)) in which the first signal is subjected to rate-matching and/or puncturing by higher layer signaling and/or DCI (Aspect 2).

The transmission/reception section 203 is capable of being a transmitter/receiver, transmission/reception circuit or transmission/reception apparatus explained based on the common recognition in the technical field according to the present invention. In addition, the transmission/reception section 203 may be comprised as an integrated transmission/reception section, or may be comprised of a transmission section and reception section.

Figure 14:
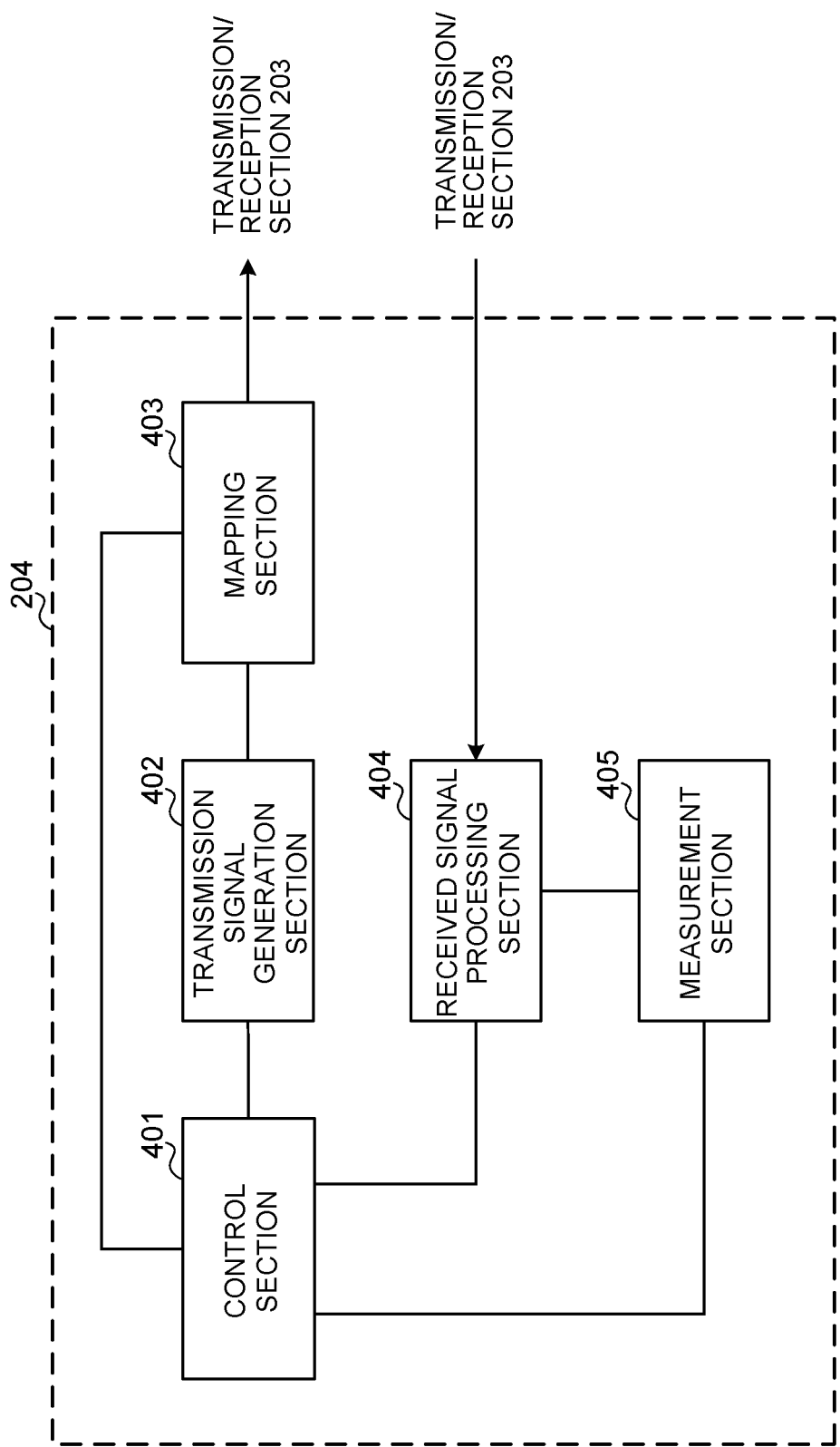
FIG. 14 is a diagram showing one example of a function configuration of the user terminal according to this Embodiment.

FIG. 14 is a diagram showing one example of a function configuration of the user terminal according to this Embodiment. In addition, FIG. 14 mainly illustrates function blocks of a characteristic portion in this Embodiment, and the user terminal 20 is assumed to have other function blocks required for radio communication. As shown in FIG. 14, the baseband signal processing section 204 that the user terminal 20 has is provided with a control section 401, transmission signal generating section 402, mapping section 403, received signal processing section 404, and measurement section 405.

The control section 401 performs control of the entire user terminal 20. For example, the control section 401 controls reception processing of the first and second signals by the received signal processing section 404, gene rat ion processing of the first and second signals by the transmission signal generating section 402, mapping of the first and second signals by the mapping section 403, and measurement by the measurement section 404.

Specifically, based on the DCI (DL assignment), the control section 401 controls reception processing (e.g., demapping, demodulation, decoding and the like) of the first signal (e.g., PDSCH) and the second signal (e.g., NPDSCH). For example, the control section 401 may control the received signal processing section 404 so as to demodulate the first and second signals based on a modulation scheme indicated by an MCS index inside the DCI. Further, the control section 401 may control the received signal processing section 404 so as to determine TBS based on a TBS index and the number of allocated resource blocks indicated by the MCS index, and decode the first and second signals based on the TBS.

Further, based on the DCI (UL grant), the control section 401 controls generation and transmission processing (e.g., coding, modulation, mapping and the like) of the first signal (e.g., PUSCH) and the second signal (e.g., NPUSCH). For example, the control section 401 may control the transmission signal processing section 402 so as to modulate the first and second signals based on a modulation scheme indicated by an MCS index inside the DCI. Furthermore, the control section 401 may control the transmission signal processing section 402 so as to determine TBS based on a TBS index and the number of allocated RBs indicated by the MCS index, and code the first and second signals based on the TBS.

As described above, frequency resources for the first signal (e.g., PDSCH/PUSCH) may be allocated, using the second allocation unit (e.g., resource block group (RBG)) comprised by including a plurality of first allocation units (e.g., resource blocks (RBs)) that are minimum allocation units.

Herein, when the CC bandwidth (system bandwidth) exceeds the maximum value (20 MHz) of the existing LTE system, the number of RBs (RBG size) constituting the RBG may be the same as the maximum number (i.e. 4) of RBs constituting the RBG in the existing system, or may be larger than 4.

Further, frequency resources for the second signal (e.g., NR-IoT, NB-IoT, NPDSCH and/or NPUSCH) may be allocated, using a frequency unit (e.g., RB) smaller than the second allocation unit (RBG). Furthermore, to the second signal, frequency resources with the same subcarrier spacing as that of the first signal may be allocated (Aspect 1), or frequency resources with a subcarrier spacing different from that of the first signal may be allocated (Aspect 2).

Furthermore, the control section 401 may control rate-matching and/or puncturing of the first signal (e.g., PDSCH/

PUSCH). For example, when the second signal (e.g., NR-IoT) is allocated to a part of frequency resources (e.g., RBG, subband) allocated to the first signal, the control section 401 may control rate-matching and/or puncturing of the first signal in a subcarrier at least a part of which overlaps with the second signal (FIG. 7).

Alternatively, in the same case, the control section 401 may control rate-matching and/or puncturing of the first signal in an RB at least a part of which overlaps with the second signal (FIGS. 6 and 8). Alternatively, in the same case, the control section 401 may control rate-matching and/or puncturing of the first signal in an RBG (or subband) at least a part of which overlaps with the second signal (FIG. 9).

Further, when candidate resources for the second signal are set by higher layer signaling, based on DCI indicating whether or not the second signal is allocated to the set candidate resources, the control section 401 may control rate-matching and/or puncturing of the first signal in the candidate resources (FIG. 6).

Furthermore, the control section 401 may control rate-matching and/or puncturing of the first signal, in frequency resources (e.g., subcarrier, RB or RBG (or subband)) designated by higher layer signaling and/or DCI (FIGS. 7, 8 and 9).

The control section 401 is capable of being comprised of a controller, control circuit or control apparatus explained based on the common recognition in the technical field according to the present invention.

Based on instructions from the control section 401, the transmission signal generating section 402 generates the first and second signals (for example, by performing coding, rate-matching, puncturing, modulation and the like) to output to the mapping section 403. The transmission signal generating section 402 is capable of being a signal generator, signal generating circuit or signal generating apparatus explained based on the common recognition in the technical field according to the present invention.

For example, according to instructions from the control section 401, in consideration of rate-matching and/or puncturing in frequency resources (e.g., subcarrier, RB or RBG (or subband)) at least a part of which overlaps with the second signal, the transmission signal processing section 404 may perform the generation processing of the first signal.

Based on instructions from the control section 401, the mapping section 403 maps the first and second signals generated in the transmission signal generating section 402 to radio resources to output to the transmission/reception section 203. The mapping section 403 is capable of being a mapper, mapping circuit or mapping apparatus explained based on the common recognition in the technical field according to the present invention.

The received signal processing section 404 performs reception processing (e.g., demapping, demodulation, decoding and the like) of the first and second signals. For example, according to instructions from the control section 401, in consideration of rate-matching and/or puncturing in frequency resources (e.g., subcarrier, RB or RBG (or subband)) at least a part of which overlaps with the second signal, the received signal processing section 404 may perform the reception processing of the first signal.

The received signal processing section 404 outputs information received from the radio base station 10 to the control section 401. For example, the received signal processing section 404 outputs, to the control section 401, broadcast information, system information, higher layer control information by higher layer signaling such as RRC signaling, L1/L2 control information (e.g., UL grant, DL assignment) and the like.

The received signal processing section 404 is capable of being comprised of a signal processor, signal processing circuit or signal processing apparatus explained based on the common recognition in the technical field according to the present invention.

The measurement section 405 measures a channel state based on a reference signal (e.g., CSI-RS) from the radio base station 10, and outputs the measurement result to the control section 401. In addition, measurement of the channel state may be performed for each CC.

The measurement section 405 is capable of being comprised of a signal processor, signal processing circuit or signal processing apparatus, and a measurement device, measurement circuit or measurement apparatus explained based on the common recognition in the technical field according to the present invention.

<Hardware Configuration>

In addition, the block diagrams used in explanation of the above-mentioned Embodiment show blocks on a function-by-function basis. These function blocks (configuration sections) are actualized by any combination of hardware and/or software. Further, the means for actualizing each function block is not limited particularly. In other words, each function block may be actualized by a single apparatus combined physically and/or logically, or two or more apparatuses that are separated physically and/or logically are connected directly and/or indirectly (e.g., by cable and/or radio), and each function block may be actualized by a plurality of these apparatuses.

Figure 15:
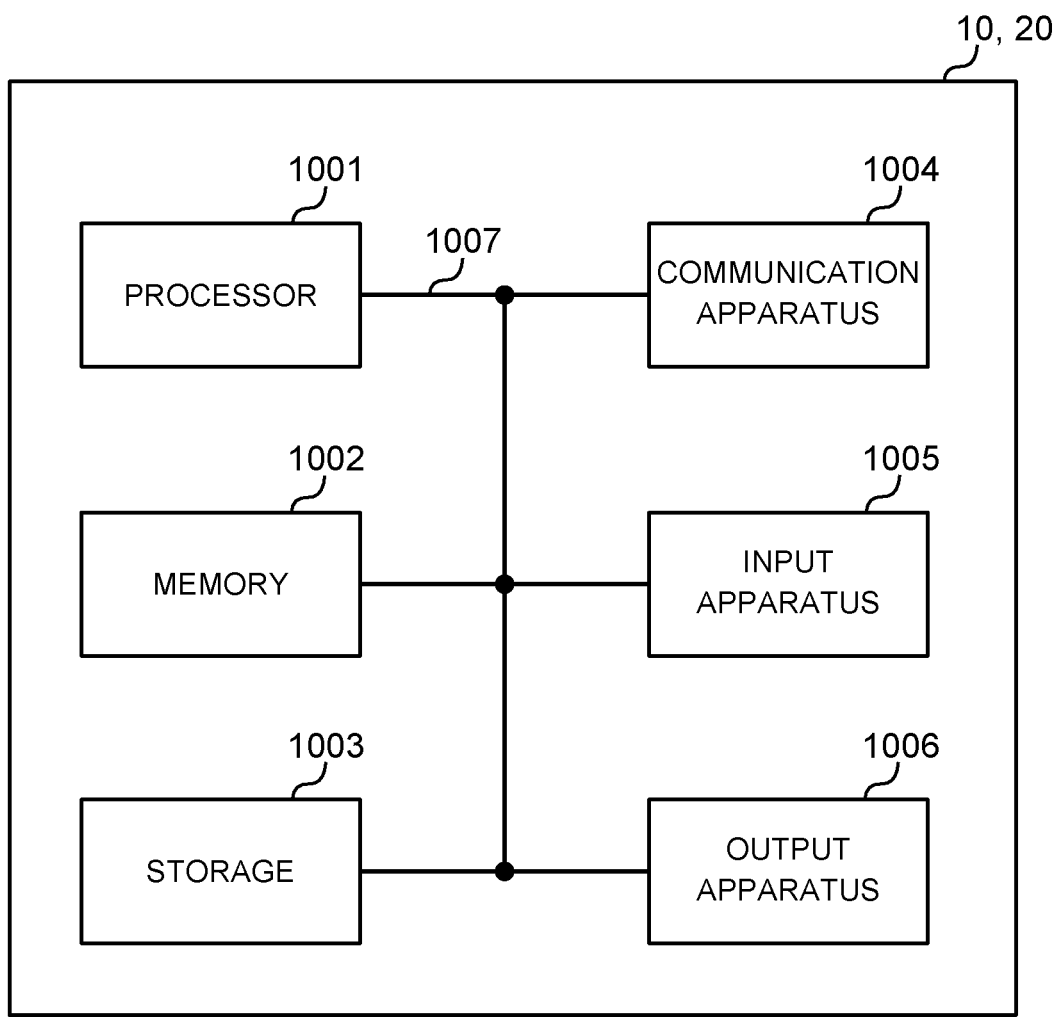
FIG. 15 is a diagram showing one example of hardware configurations of the radio base station and user terminal according to this Embodiment.

For example, each of the radio base station, user terminal and the like in this Embodiment may function as a computer that performs the processing of the radio communication method of the present invention. FIG. 15 is a diagram showing one example of a hardware configuration of each of the radio base station and user terminal according to this Embodiment. Each of the radio base station 10 and user terminal 20 as described above may be physically configured as a computer apparatus including a processor 1001, memory 1002, storage 1003, communication apparatus 1004, input apparatus 1005, output apparatus 1006, bus 1007 and the like.

In addition, in the following description, it is possible to replace the letter of "apparatus" with a circuit, device, unit and the like to read. With respect to each apparatus shown in the figure, the hardware configuration of each of the radio base station 10 and the user terminal 20 may be configured so as to include a single or a plurality, or may be configured without including a part of apparatuses.

For example, a single processor 1001 is shown in the figure, but a plurality of processors may exist. Further, the processing may be executed by a single processor, or may be executed by one or more processors at the same time, sequentially or by another technique. In addition, the processor 1001 may be implemented on one or more chips.

For example, each function in the radio base station 10 and user terminal 20 is actualized in a manner such that predetermined software (program) is read on the hardware of the processor 1001, memory 1002 and the like, and that the processor 1001 thereby performs computations, and controls communication by the communication apparatus 1004, and read and/or write of data in the memory 1002 and storage 1003.

For example, the processor 1001 operates an operating system to control the entire computer. The processor 1001 may be comprised of a Central Processing Unit (CPU) including interfaces with peripheral apparatuses, control apparatus, computation apparatus, register and the like. For example, the above-mentioned baseband signal processing section 104 (204), call processing apparatus 105 and the like may be actualized by the processor 1001.

Further, the processor 1001 reads the program (program code), software module, data and the like on the memory 1002 from the storage 1003 and/or the communication apparatus 1004, and according thereto, executes various kinds of processing. Used as the program is a program that causes the computer to execute at least apart of operation described in the above-mentioned Embodiment. For example, the control section 401 of the user terminal 20 may be actualized by a control program stored in the memory 1002 to operate in the processor 1001, and the other function blocks may be actualized similarly.

The memory 1002 is a computer-readable storage medium, and for example, may be comprised of at least one of ROM (Read Only Memory), EPROM (Erasable Programmable ROM), EEPROM (Electrically EPROM), RAM (Random Access Memory) and other proper storage media. The memory 1002 may be called the register, cache, main memory (main storage apparatus) and the like. The memory 1002 is capable of storing the program (program code), software module and the like executable to implement the radio communication method according to one Embodiment of the present invention.

The storage 1003 is a computer-readable storage medium, and for example, may be comprised of at least one of a flexible disk, floppy (Registered Trademark) disk, magneto-optical disk (e.g., compact disk (CD-ROM (Compact Disc ROM), etc.), digital multi-purpose disk, Blu-ray (Registered Trademark) disk), removable disk, hard disk drive, smart card, flash memory device (e.g., card, stick, key drive), magnetic stripe, database, server and other proper storage media. The storage 1003 may be called an auxiliary storage apparatus.

The communication apparatus 1004 is hardware (transmission/reception device) to perform communication between computers via a wired and/or wireless network, and for example, is also referred to as a network device, network controller, network card, communication module and the like. For example, in order to actualize Frequency Division Duplex (FDD) and/or Time Division Duplex (TDD), the communication apparatus 1004 may be comprised by including a high-frequency switch, duplexer, filter, frequency synthesizer and the like. For example, the transmission/reception antenna 101 (201), amplifying section 102 (202), transmission/reception section 103 (203), transmission path interface 106 and the like as described above may be actualized by the communication apparatus 1004.

The input apparatus 1005 is an input device (e.g., keyboard, mouse, microphone, switch, button, sensor and the like) that receives input from the outside. The output apparatus 1006 is an output device (e.g., display, speaker, LED (Light Emitting Diode) lamp and the like) that performs output to the outside. In addition, the input apparatus 1005 and output apparatus 1006 may be an integrated configuration (e.g., touch panel).

Further, each apparatus of the processor 1001, memory 1002 and the like is connected on the bus 1007 to communicate information. The bus 1007 may be comprised of a single bus, or may be comprised of different buses between apparatuses.

Furthermore, each of the radio base station 10 and user terminal 20 may be configured by including hardware such as a microprocessor, Digital Signal Processor (DSP), ASIC (Application Specific Integrated Circuit), PLD (Programmable Logic Device), and FPGA (Field Programmable Gate Array), or apart or the whole of each function block may be actualized by the hardware. For example, the processor 1001 may be implemented by at least one of the hardware.

(Modification)

In addition, the term explained in the present Description and/or the term required to understand the present Description may be replaced with a term having the same or similar meaning. For example, the channel and/or the symbol may be a signal (signaling). Further, the signal may be a message. The reference signal is capable of being abbreviated as RS (Reference Signal), and according to the standard to apply, may be called a pilot, pilot signal and the like. Furthermore, the component carrier (CC) may be called a cell, frequency carrier, carrier frequency and the like.

Further, the radio frame may be comprised of a single or a plurality of frames in the time domain. The single or each of the plurality of frames constituting the radio frame may be called a subframe. Furthermore, the subframe may be comprised of a single or a plurality of slots in the time domain. Still furthermore, the slot may be comprised of a single or a plurality of symbols (OFDM (Orthogonal Frequency Division Multiplexing) symbol, SC-FDMA (Single Carrier Frequency Division Multiple Access) symbol and the like) in the time domain.

Each of the radio frame, subframe, slot and symbol represents a time unit in transmitting a signal. For the radio frame, subframe, slot and symbol, another name corresponding to each of them may be used. For example, one sub frame may be called Transmission Time Interval (TTI), a plurality of contiguous subframes may be called TTI, or one slot may be called TTI. In other words, the subframe and TTI may be the subframe (1 ms) in the existing LTE, may be a frame (e.g., 1 to 13 symbols) shorter than 1 ms, or may be a frame longer than 1 ms.

Herein, for example, the TTI refers to a minimum time unit of scheduling in radio communication. For example, in the LTE system, the radio base station performs scheduling for allocating radio resources (frequency bandwidth, transmit power and the like capable of being used in each user terminal) to each user terminal in a TTI unit. In addition, the definition of the TTI is not limited thereto. The TTI may be a transmission time unit of a data packet (transport block) subjected to channel coding, or may be a processing unit of scheduling, link adaptation and the like.

The TTI having a time length of 1 ms may be called ordinary TTI (TTI in LTE Rel.8-12), normal TTI, long TTI, ordinary subframe, normal subframe, long subframe or the like. TTI shorter than the ordinary TTI may be called reduced TTI, short TTI, reduced subframe, short subframe or the like.

The resource block (RB) is a resource allocation unit in the time domain and frequency domain, and may include a single or a plurality of contiguous subcarriers in the frequency domain. Further, the RB may include a single or a plurality of symbols in the time domain, and may have a length of 1 slot, 1 subcarrier, or 1 TTI. Each of 1 TTI and 1 subframe may be comprised of a single or a plurality of resource blocks. In addition, the RB may be called a physical resource block (PRB: Physical RB)), PRB pair, RB pair and the like.

Further, the resource block may be comprised of a single or a plurality of resource elements (RE: Resource Element). For example, 1 RE may be a radio resource region of 1 subcarrier and 1 symbol.

In addition, structures of the above-mentioned radio frame, subframe, slot, symbol and the like are only illustrative. For example, it is possible to modify, in various manners, configurations of the number of subframes included in the radio frame, the number of slots included in the subframe, the numbers of symbols and RBs included in the slot, the number of subcarriers included in the RB, the number of symbols within the TTI, the symbol length, the cyclic prefix (CP) length and the like.

Further, the information, parameter and the like explained in the present Description may be expressed by an absolute value, may be expressed by a relative value from a predetermined value, or may be expressed by another corresponding information. For example, the radio resource may be indicated by a predetermined index. Further, equations using these parameters and the like may be different from those explicitly disclosed in the present Description.

The names used in the parameter and the like in the present Description are not restrictive in any respects. For example, it is possible to identify various channels (PUCCH (Physical Uplink Control Channel), PDCCH (Physical Downlink Control Channel) and the like) and information elements, by any suitable names, and therefore, various names assigned to these various channels and information elements are not restrictive in any respects.

The information, signal and the like explained in the present Description may be represented by using any of various different techniques. For example, the data, order, command, information, signal, bit, symbol, chip and the like capable of being described over the entire above-mentioned explanation may be represented by voltage, current, electromagnetic wave, magnetic field or magnetic particle, optical field or photon, or any combination thereof.

Further, the information, signal and the like are capable of being output from a higher layer to a lower layer, and/or from the lower layer to the higher layer. The information, signal and the like may be input and output via a plurality of network nodes.

The input/output information, signal and the like may be stored in a particular place (e.g., memory), or may be managed with a management table. The input/output information, signal and the like are capable of being rewritten, updated or edited. The output information, signal and the like may be deleted. The input information, signal and the like may be transmitted to another apparatus.

Notification of the information is not limited to the Aspect/Embodiment described in the present Description, and may be performed by another method. For example, notification of the information may be performed using physical layer signaling (e.g., Downlink Control Information (DCI), Uplink Control Information (UCI)), higher layer signaling (e.g., RRC (Radio Resource Control) signaling, broadcast information (Master Information Block (MIB), System Information Block (SIB) and the like), MAC (Medium Access Control) signaling), other signals, or combination thereof.

In addition, physical layer signaling may be called L1/L2 (Layer 1/Layer 2) control information (L1/L2 control signal), L1 control information (L1 control signal) and the like. Further, RRC signaling may be called RRC message, and for example, may be RRC Connection Setup message, RRC Connection Reconfiguration message and the like. Furthermore, for example, MAC signaling may be notified by MAC Control Element (MAC CE).

Further, notification of predetermined information (e.g., notification of "being X") is not limited to notification that is performed explicitly, and may be performed implicitly (e.g., notification of the predetermined information is not performed, or by notification of different information).

The decision may be made with a value ("0" or "1") expressed by 1 bit, may be made with a Boolean value represented by true or false, or may be made by comparison with a numerical value (e.g., comparison with a predetermined value).

Irrespective of that the software is called software, firmware, middle-ware, micro-code, hardware descriptive term, or another name, the software should be interpreted widely to mean a command, command set, code, code segment, program code, program, sub-program, software module, application, software application, software package, routine, sub-routine, object, executable file, execution thread, procedure, function and the like.

Further, the software, command, information and the like may be transmitted and received via a transmission medium. For example, when the software is transmitted from a website, server or another remote source using wired techniques (coaxial cable, optical fiber cable, twisted pair, Digital Subscriber Line (DSL) and the like) and/or wireless techniques (infrared, microwave and the like), these wired techniques and/or wireless techniques are included in the definition of the transmission medium.

The terms of "system" and "network" used in the present Description are used interchangeably.

In the present Description, the terms of "Base Station (BS)", "radio base station", "eNB", "cell", "sector", "cell group", "carrier" and "component carrier" are capable of being used interchangeably. There is the case where the base station is called by the terms of fixed station, NodeB, eNodeB (eNB), access point, transmission point, reception point, femto-cell, small cell and the like.

The base station is capable of accommodating a single or a plurality of (e.g., three) cells (also called the sector). When the base station accommodates a plurality of cells, the entire coverage area of the base station is capable of being divided into a plurality of smaller areas, and each of the smaller areas is also capable of providing communication services by a base station sub-system (e.g., small base station (RRH: Remote Radio Head) for indoor use). The term of "cell" or "sector" refers to a part or the whole of coverage area of the base station and/or base station sub-system that performs communication services in the coverage.

In the present Description, the terms of "Mobile Station (MS)", "user terminal", "User Equipment (UE)", and "terminal" are capable of being used interchangeably. There is the case where the base station is called by the terms of fixed station, NodeB, eNodeB (eNB), access point, transmission point, reception point, femto-cell, small cell and the like.

There is the case where the Mobile Station may be called using a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms, by the person skilled in the art.

Further, the radio base station in the present Description may be read with the user terminal. For example, each Aspect/Embodiment of the present invention may be applied to a configuration where communication between the radio base station and the user terminal is replaced with communication among a plurality of user terminals (D2D: Device-to-Device). In this case, the functions that the above-mentioned radio base station 10 has may be the configuration that the user terminal 20 has. Further, the words of "up", "down" and the like may be read with "side". For example, the uplink channel may be read with a side channel.

Similarly, the user terminal in the present Description may be read with the radio base station. In this case, the functions that the above-mentioned user terminal 20 has may be the configuration that the radio base station 10 has.

In the present Description, particular operation performed by the base station may be performed by the upper node in some case. In a network comprised of a single or a plurality of network nodes having the base station, it is obvious that various operations performed for communication with the terminal are performed by the base station, one or more network nodes (e.g., MME (MobilityManagementEntity), S-GW (Serving-Gateway) and the like are considered, but the invention is not limited thereto) except the base station, or combination thereof.

Each Aspect/Embodiment explained in the present Description may be used alone, may be used in combination, or may be switched and used according to execution. Further, with respect to the processing procedure, sequence, flowchart and the like of each Aspect/Embodiment explained in the present Description, unless there is a contradiction, the order may be changed. For example, with respect to the methods explained in the present Description, elements of various steps are presented in illustrative order, and are not limited to the presented particular order.

Each Aspect/Embodiment explained in the present Description may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Registered Trademark) (Global System for Mobile communications), CDMA 2000, UMB (Ultra Mobile Broadband), IEEE 802.11 (Wi-Fi (Registered Trademark)), IEEE 802.16 (WiMAX (Registered Trademark)), IEEE 802.20, UWB (Ultra-WideBand), Bluetooth (Registered Trademark), system using another proper radio communication method and/or the next-generation system extended based thereon.

The description of "based on" used in the present Description does not mean "based on only", unless otherwise specified. In other words, the description of "based on" means both of "based on only" and "based on at least".

Any references to elements using designations of "first", "second" and the like used in the present Description are not intended to limit the amount or order of these elements overall. These designations are capable of being used in the present Description as the useful method to distinguish between two or more elements. Accordingly, references of first and second elements do not mean that only two elements are adopted, or that the first element should be prior to the second element in any manner.

There is the case where the term of "determining" used in the present Description includes various types of operation. For example, "determining" may be regarded as "determining" calculating, computing, processing, deriving, investigating, looking up (e.g., search in a table, database or another data structure), ascertaining and the like. Further, "determining" may be regarded as "determining" receiving (e.g., receiving information), transmitting (e.g., transmitting information), input, output, accessing (e.g., accessing data in memory) and the like. Furthermore, "determining" may be regarded as "determining" resolving, selecting, choosing, establishing, comparing and the like. In other words, "determining" may be regarded as "determining" some operation.

The terms of "connected" and "coupled" used in the present Description or any modifications thereof mean direct or indirect every connection or coupling among two or more elements, and are capable of including existence of one or more intermediate elements between two mutually "connected" or "coupled" elements. Coupling or connection between elements may be physical, may be logical or may be combination thereof. In the case of using in the present Description, it is possible to consider that two elements are mutually "connected" or "coupled", by using one or more electric wires, cable and/or print electric connection, and as some non-limited and non-inclusive examples, electromagnetic energy such as electromagnetic energy having wavelengths in a radio frequency region, microwave region and light (both visible and invisible) region.

In the case of using "including", "comprising" and modifications thereof in the present Description and the scope of the claims, as in the term of "provided with", these terms are intended to be inclusive. Further, the term of "or" used in the present Description and the scope of the claims is intended to be not exclusive OR.

As described above, the present invention is described in detail, but it is obvious to a person skilled in the art that the invention is not limited to the Embodiment described in the present Description. The invention is capable of being carried into practice as modified and changed aspects without departing from the subject matter and scope of the invention defined by the descriptions of the scope of the claims. Accordingly, the descriptions of the present Description are intended for illustrative explanation, and do not have any restrictive meaning to the invention.

The present application is based on Japanese Patent Application No. 2016-140778 filed on Jul. 15, 2016, entire content of which is expressly incorporated by reference herein.

The invention claimed is:

1. A terminal comprising:
a receiver that receives a downlink shared channel; and
a processor that controls rate-matching of the downlink shared channel based on a candidate resource configured by higher layer signaling,
wherein the processor supports a first case of configuring the candidate resource with a same subcarrier spacing as the downlink shared channel and a second case of configuring the candidate resource with a different subcarrier spacing from the downlink shared channel, and
wherein the downlink shared channel around the candidate resource, the candidate resource being unavailable for the downlink shared channel, is subject to the rate-matching, and the candidate resource is configured per resource block.

2. The terminal according to claim 1, wherein the processor controls the rate-matching of the downlink shared channel based on a resource in the candidate resource configured by the higher layer signaling, the resource being a resource specified by downlink control information used for scheduling of the downlink shared channel.

3. A radio base station comprising:
a transmitter that transmits a downlink shared channel; and
a processor that controls rate-matching of the downlink shared channel based on a candidate resource configured in a terminal by higher layer signaling,
wherein the processor supports a first case of configuring the candidate resource with a same subcarrier spacing as the downlink shared channel and a second case of configuring the candidate resource with a different subcarrier spacing from the downlink shared channel, and wherein the downlink shared channel around the candidate resource, the candidate resource being unavailable for the downlink shared channel, is subject to the rate-matching, and the candidate resource is configured per resource block.

4. A radio communication method comprising:

receiving a downlink shared channel; and controlling rate-matching of the downlink shared channel based on a candidate resource configured by higher layer signaling, wherein the method supports a first case of configuring the candidate resource with a same subcarrier spacing as the downlink shared channel and a second case of configuring the candidate resource with a different subcarrier spacing from the downlink shared channel, and wherein the downlink shared channel around the candidate resource, the candidate resource being unavailable for the downlink shared channel, is subject to the rate-matching, and the candidate resource is configured per resource block.

* * * * *